(12) United States Patent
Tojo et al.

(10) Patent No.: US 9,747,190 B2
(45) Date of Patent: Aug. 29, 2017

(54) ANALYSIS SYSTEM, ANALYSIS METHOD, AND COMPUTER PROGRAM PRODUCT

(71) Applicant: Kabushiki Kaisha Toshiba, Minato-ku (JP)

(72) Inventors: Nobuaki Tojo, Tachikawa (JP); Hidenori Matsuzaki, Fuchu (JP); Akira Kuroda, Yokohama (JP); Mayuko Koezuka, Ota-ku (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/333,915

(22) Filed: Jul. 17, 2014

(65) Prior Publication Data
US 2015/0026666 A1   Jan. 22, 2015

(30) Foreign Application Priority Data

Jul. 22, 2013  (JP) ................................ 2013-152161
Jul. 15, 2014  (JP) ................................ 2014-145281

(51) Int. Cl.
*G06F 11/36*  (2006.01)
(52) U.S. Cl.
CPC .............................. *G06F 11/3636* (2013.01)
(58) Field of Classification Search
None
See application file for complete search history.

(56) References Cited

U.S. PATENT DOCUMENTS

| 5,838,975 A * | 11/1998 | Abramson et al. ............ 717/129 |
| 6,230,313 B1 * | 5/2001 | Callahan, II ........ G06F 11/3404 |
| | | 714/35 |
| 7,174,536 B1 * | 2/2007 | Kothari et al. ............... 717/109 |
| 7,320,124 B2 | 1/2008 | Horikawa |
| 7,530,056 B1 * | 5/2009 | Yaari ................... G06F 11/3604 |
| | | 717/128 |

(Continued)

OTHER PUBLICATIONS

Sosic et al., Guard: a relative debugger, Feb. 1997, John Wiley & Sons, Inc, Software-Practice & Experience, vol. 27 Issue 2, pp. 185-206.*

(Continued)

*Primary Examiner* — Chat Do
*Assistant Examiner* — Douglas Slachta
(74) *Attorney, Agent, or Firm* — Oblon, McClelland, Maier & Neustadt, L.L.P.

(57) ABSTRACT

According to an embodiment, a system includes an analysis generator, a trace difference generator, a program difference generator, and an analyzer. The analysis generator is configured to generate program information required in executing a program, generate trace information providing a description of an execution at particular timing, based on the program information, and generate a trace correspondence between the trace and program information. The trace difference generator is configured to generate a trace difference between first and second trace information. The program difference generator is configured to generate a program difference between first and second program information. The analyzer is configured to analyze a correspondence relation between the differences and the program information based on the trace correspondence.

9 Claims, 14 Drawing Sheets

(56) References Cited

U.S. PATENT DOCUMENTS

| | | | | |
|---|---|---|---|---|
| 8,584,097 B2* | 11/2013 | Lindahl et al. | ............... | 717/129 |
| 8,683,438 B2* | 3/2014 | Orrick | ........................... | 717/124 |
| 9,117,025 B2* | 8/2015 | Shann | ................. | G06F 11/3664 |
| 2003/0145125 A1 | 7/2003 | Horikawa | | |
| 2006/0259825 A1* | 11/2006 | Cruickshank | ....... | G06F 11/3419 |
| | | | | 714/38.1 |
| 2008/0148239 A1* | 6/2008 | Petrov | ................. | G06F 11/3636 |
| | | | | 717/128 |
| 2008/0270995 A1* | 10/2008 | Dimpsey | ................. | G06F 11/36 |
| | | | | 717/128 |
| 2010/0299654 A1* | 11/2010 | Vaswani | ............... | G06F 11/366 |
| | | | | 717/128 |
| 2011/0055818 A1* | 3/2011 | Ishikawa | ................... | G06F 8/51 |
| | | | | 717/128 |
| 2011/0145788 A1* | 6/2011 | Xu | ........................ | G06F 11/368 |
| | | | | 717/121 |
| 2012/0137273 A1* | 5/2012 | Meijler | ............... | G06F 11/3476 |
| | | | | 717/128 |
| 2012/0233600 A1* | 9/2012 | Uno | .................... | G06F 11/3636 |
| | | | | 717/128 |
| 2013/0179867 A1* | 7/2013 | Fitterer et al. | ................ | 717/130 |

OTHER PUBLICATIONS

Abramson et al., Relative Debugging using Multiple Program Versions, May 1995, Int'l Symposium on Languages for Intensional Programming.*

Yoshiro Ito, et al., "Detecting difference between the execution trace extracted from two versions of a program", IPSJ SIG Technical Report, No. 5, 2010, pp. 1-8 (with English Abstract).

* cited by examiner

```
1:    int main() {
2:      int i = 0;
3:      for(i = 0; i < 3; i++) {
4:        funcA();
5:      }
6:    }
7:
8:    int funcA() {
...   ...
300:  }
```
301

(b)

```
1:    int main() {
2:      int i = 0;
3:      for(i = 0; i < 5; i++) {
4:        funcA();
5:      }
6:    }
7:
8:    int funcA() {
...   ...
300:  }
```
302

CYCLE  OBJECT  STATUS

```
1    main  start
10   funcA start
110  funcA end
120  funcA start
220  funcA end
230  funcA start
330  funcA end
340  main  end
```
401

(b)

CYCLE  OBJECT  STATUS

```
1    main  start
10   funcA start
110  funcA end
120  funcA start
220  funcA end
230  funcA start
330  funcA end
340  funcA start
440  funcA end
450  funcA start
550  funcA end
560  main  end
```
402

| | | /src/1/main.c | /src/2/main.c |
|---|---|---|---|
| 1 | 1 | int main() { | int main() { |
| 2 | 2 |   int i = 0; |   int i = 0; |
| 3 | 3 |   for(i = 0; i < 3; i++) { |   for(i = 0; i < 5; i++) { |
| 4 | 4 |     funcA(); |     funcA(); |
| 5 | 5 |   } |   } |
| 6 | 6 | } | } |
| 7 | 7 | | |
| 8 | 8 | int funcA() { | int funcA() { |
| ... | ... | ... | ... |
| 300 | 300 | } | } |

```
1:    int main() {
2:      int max = 5;
3:      int i = 0;
4:      max = max - 2;
5:      for(i = 0; i < max; i++) {
6:        funcA();
7:      }
8:    }
9:
10:   int funcA() {
...   ...
300:  }
```

901

(b)

```
1:    int main() {
2:      int max = 5;
3:      int i = 0;
4:      for(i = 0; i < max; i++) {
5:        funcA();
6:      }
7:    }
8:
9:    int funcA() {
...   ...
299:  }
```

CYCLE  OBJECT  STATUS

```
1    main   start
10   funcA  start
110  funcA  end
120  funcA  start
220  funcA  end
230  funcA  start
330  funcA  end
340  main   end
```

1001

(b)

CYCLE  OBJECT  STATUS

```
1    main   start
10   funcA  start
110  funcA  end
120  funcA  start
220  funcA  end
230  funcA  start
330  funcA  end
340  funcA  start
440  funcA  end
450  funcA  start
550  funcA  end
560  main   end
```

```
1:    int main() {
2:      int max = 5;
3:      int i = 0;
4:      for(i = 0; i < max; i++) {
5:        funcA();
6:      }
7:    }
8:
9:    int funcA() {
...   ...
299:  }
```

1501

(b)

```
1:    int main() {
2:      int max = 5;
3:      int i = 0;
4:      max = max - 2;
5:      for(i = 0; i < max; i++) {
6:        funcA();
7:      }
8:    }
9:
10:   int funcA() {
...   ...
300:  }
```

CYCLE  OBJECT  STATUS

```
1    main   start
10   funcA  start
110  funcA  end
120  funcA  start
220  funcA  end
230  funcA  start
330  funcA  end
340  funcA  start
440  funcA  end
450  funcA  start
550  funcA  end
560  main   end
```

1601

(b)

CYCLE  OBJECT  STATUS

```
1    main   start
10   funcA  start
110  funcA  end
120  funcA  start
220  funcA  end
230  funcA  start
330  funcA  end
340  main   end
```

1602

FILE NAME main.c - 4

1901

2001

|  |  | /src/1/main.c | /src/2/main.c |
|---|---|---|---|
| 1 | 1 | int main() {  | int main() { |
| 2 | 2 |   int max = 5; |   int max = 5; |
| 3 | 3 |   int i = 0; |   int i = 0; |
|  | 4 |  |   max = max - 2; |
| 4 | 5 |   for(i = 0; i < max; i++) { |   for(i = 0; i < max; i++) { |
| 5 | 6 |     funcA(); |     funcA(); |
| 6 | 7 |   } |   } |
| 7 | 8 | } | } |
| 8 | 9 |  |  |
| 9 | 10 | int funcA() { | int funcA() { |
| ... | ... | ... | ... |
| 299 | 300 | } | } |

2020 → (row 3)

2010  2011  2012  2013

2030, 2031

FIG.22
(a)
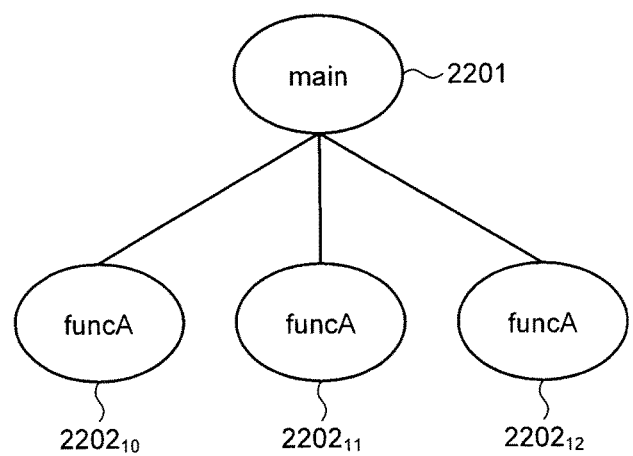
(b)
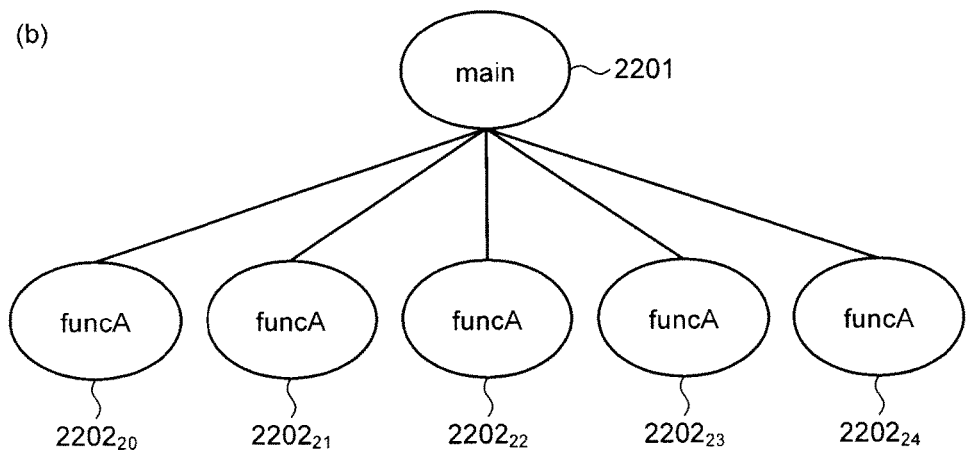

ANALYSIS SYSTEM, ANALYSIS METHOD, AND COMPUTER PROGRAM PRODUCT

CROSS-REFERENCE TO RELATED APPLICATION

This application is based upon and claims the benefit of priority from Japanese Patent Application No. 2013-152161, filed on Jul. 22, 2013; and Japanese Patent Application No. 2014-145281, filed on Jul. 15, 2014, the entire contents of which are incorporated herein by reference.

FIELD

Embodiments described herein relate generally to an analysis system, an analysis method, and a computer program product.

BACKGROUND

There have conventionally been some techniques developed for checking the operations of a computer program. There have also been other techniques developed for comparing how differently a computer program behaves, when the computer program is corrected due to a program upgrade or the like, with the computer program before the correction.

To find out which part of the computer program has been modified based on a plurality of computer program behaves, because users have traditionally inferred from the differences in pieces of behavior information acquired from the respective computer programs, such an analysis has been rendered difficult. Conducting sufficient analyses of the operations of a plurality of computer programs have been thus difficult.

BRIEF DESCRIPTION OF THE DRAWINGS

FIG. 3 illustrates examples of computer programs to be input to an input unit;

FIG. 4 illustrates examples of trace information according to the first embodiment;

FIG. 9 illustrates examples of computer programs for explaining a second case;

FIG. 10 illustrates examples of trace information in the second case according to the first embodiment;

FIG. 15 illustrates examples of computer programs for explaining a third case;

FIG. 16 illustrates examples of trace information in the third case according to the first embodiment;

FIG. 22 illustrates conceptual diagrams of trace information represented as tree structures.

DETAILED DESCRIPTION

According to an embodiment, an analysis system includes an input unit, an analysis information generator, a trace difference information generator, a program difference information generator, a correspondence relation analyzer, and a display information generator. The input unit is configured to receive a program. The analysis information generator is configured to generate program information from information required in executing the program, generate trace information that provides a description of an execution at particular timing while the program is being executed, based on the program information, and generate trace correspondence relation information that indicates a correspondence relation between the trace information and the program information based on the trace information and the program information. The trace difference information generator is configured to generate trace difference information that indicates a difference between first trace information and second trace information, the first trace information being generated by the analysis information generator based on first program information generated by the analysis information generator, the second trace information being generated by the analysis information generator based on second program information generated by the analysis information generator. The program difference information generator is configured to generate program difference information that indicates a difference between the first program information and the second program information. The correspondence relation analyzer is configured to analyze a correspondence relation between the trace difference information, the program difference information, the first program information, and the second program information based on the trace correspondence information. The display information generator is configured to generate display information for displaying the correspondence relation in a manner associated with at least one of the first program information and the second program information.

First Embodiment

Figure 1:
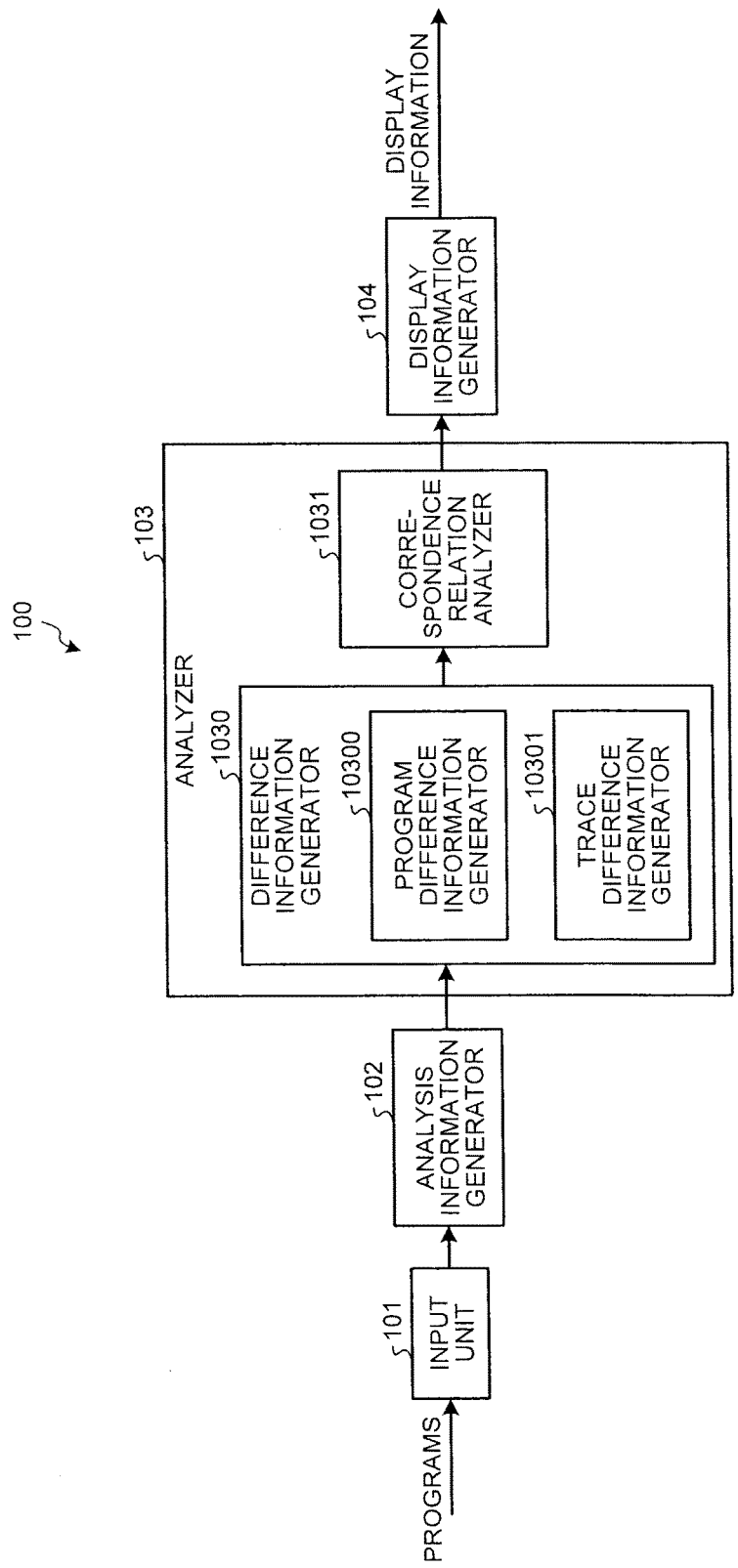
FIG. 1 is a functional block diagram of exemplary functions of an analysis apparatus according to a first embodiment.

An analysis system, an analysis method, and an analysis program according to a first embodiment will now be explained. FIG. 1 is a functional block diagram of exemplary functions of an analysis apparatus according to the first embodiment. In FIG. 1, this analysis apparatus 100 includes an input unit 101, an analysis information generator 102, an analyzer 103, and a display information generator 104. The input unit 101, the analysis information generator 102, the analyzer 103, and the display information generator 104 may be implemented with pieces of hardware cooperating with one another, or these units may be partly or entirely implemented with a computer program operating on a central processing unit (CPU).

The configuration of the analysis apparatus 100 according to the first embodiment is not limited to the example illustrated in FIG. 1. The analysis apparatus 100 may also include a plurality of functional blocks (the input unit 101, the analysis information generator 102, the analyzer 103, and the display information generator 104) operating cooperatively. The analysis apparatus 100 may also have some of the functional blocks arranged in a different order, or some of the functional blocks distributed to the others. The analysis apparatus 100 may have a combination of these four configurations, or the functional blocks may be partly or entirely distributed to a plurality of modules.

For a plurality of computer programs received via the input unit 101, the analysis apparatus 100 finds differences in respective pieces of information required in executing the respective computer programs, and differences in the operations resulting from executing the respective computer programs. The received computer programs and the information required in executing the computer program include the source codes, for example. The analysis apparatus 100 analyzes how the differences in the information required in execution are related the differences in the operation, both differences of which are thus found for the computer programs, based on another piece of information that relates information required in executing the computer programs to the difference in the operations, and displays the result of the analysis in a manner associated with at least one of the pieces of information required in executing the respective computer programs. In this manner, the analysis apparatus 100 can visualize how a difference in the information required in executing the computer programs is related a difference in the operations.

The configuration of the analysis apparatus 100 will now be explained more in detail. The analyzer 103 in the analysis apparatus 100 includes a difference information generator 1030 and a correspondence relation analyzer 1031. The difference information generator 1030 includes a program difference information generator 10300 and a trace difference information generator 10301.

Figure 2:
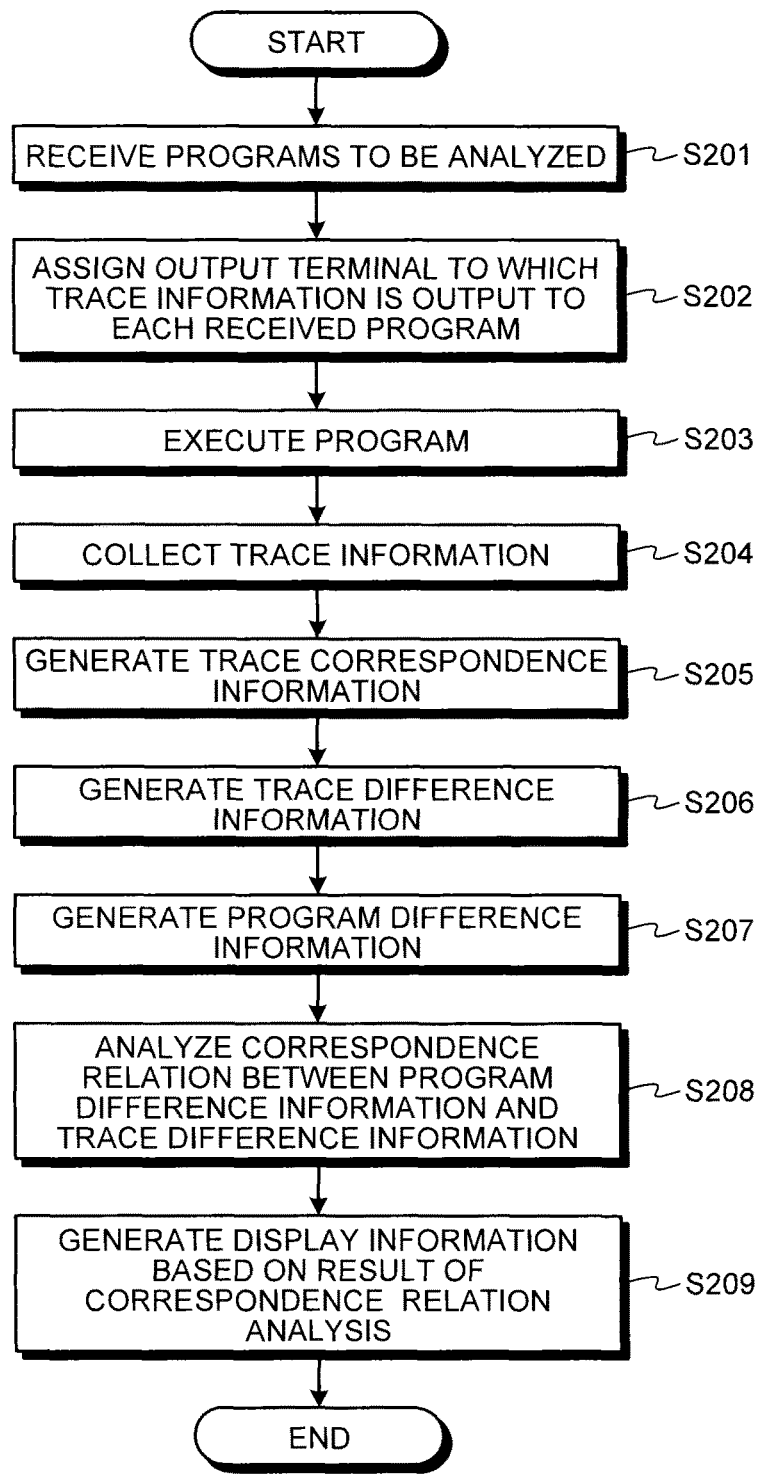
FIG. 2 is a flowchart illustrating an example of an analysis process performed by the analysis apparatus according to the first embodiment.

FIG. 2 is a flowchart illustrating an exemplary analysis process performed by the analysis apparatus 100 according to the first embodiment. Before executing the analysis process illustrated in the flowchart in FIG. 2, the input unit 101 receives a plurality of computer programs that are to be analyzed. The input unit 101 then stores the received computer programs in a memory or the like.

In this embodiment, the input unit 101 receives a first computer program and a second computer program, which are two computer programs in total. The second computer program is explained to be the first computer program having a part of which modified, as an example.

At Step S201, the analysis information generator 102 receives one of the computer programs to be analyzed from the input unit 101. At following Step S202, the analysis information generator 102 assigns a trace information output terminal to the received computer program. The trace information output terminal is an output port (tracepoint) to which result of the execution of the computer program is output from the computer program. The trace information captures the operation performed at a specific timing while the computer programs are being executed.

At following Step S203, the analysis information generator 102 executes the computer program having assigned with a trace information output terminal, and acquires information required in executing the computer program, e.g., configuration information used in the execution of the computer program and the received computer program itself. At following Step S204, the analysis information generator 102 collects the trace information output to the output terminal assigned in the computer programs being executed. At following Step S205, the analysis information generator 102 generates trace correspondence information indicating a correspondence relation between the trace information collected at Step S204 and the program information.

Steps S201 to S205 are repeated for each one of the computer programs to be analyzed.

When the analysis information generator 102 completes Steps S201 to S205 for all of the computer programs to be analyzed, the analysis apparatus 100 moves the process to Step S206. At Step S206, the difference information generator 1030 acquires the trace information and the trace correspondence information collected for each piece of computer program information from the analysis information generator 102. The trace difference information generator 10301 then looks for differences between the acquired pieces of trace information, and generates trace difference information.

At following Step S207, the difference information generator 1030 acquires the pieces of program information from the analysis information generator 102. The program difference information generator 10300 then looks for a difference between the acquired pieces of program information, and generates program difference information.

At following Step S208, the correspondence relation analyzer 1031 acquires the program difference information generated by the program difference information generator 10300, the trace difference information generated by the trace difference information generator 10301, and the trace correspondence information, and analyzes a correspondence relation between the program difference information and the trace difference information, based on the trace correspondence information.

At following Step S209, based on the result of the analysis conducted by the correspondence relation analyzer 1031, the program difference information, the trace difference information, and the trace correspondence information, the display information generator 104 generates display information for visualizing, that is, for displaying the correspondence relations between the differences in the trace information and the differences in the program information. The generated display information is then sent to a display device such as a liquid crystal display (LCD), and displayed on the display device.

In the example explained above, Steps S201 to S205 are performed for each of the computer programs, but is not limited thereto. For example, Steps S201 to S205 may be performed for the computer programs to be analyzed in parallel. Step S206 and steps thereafter may also be executed for each computer programs, or executed in parallel. The order in which Steps S206 and S207 are performed may be reversed. Each of the steps may also be performed in parallel, accordingly to the type of information included in the program information or the trace information.

The process performed by each of the units included in the analysis apparatus 100 illustrated in FIG. 1 will now be explained more in detail. The analysis information generator 102 generates trace information, trace correspondence information, and program information, from the computer programs to be analyzed received by the input unit 101. The input unit 101 receives the computer programs to be analyzed in the form of source codes described in a programming language such as C language or Java (registered trademark) language. The language in which the computer programs to be analyzed are described is not particularly limited.

FIG. 3 illustrates examples of the computer programs to be analyzed. In FIG. 3, (a) illustrates an example of the source code of a computer program 301 that is the first computer program to be analyzed, and (b) illustrates an example of the source code of another computer program 302 that is the second computer program to be analyzed, analyzed as a pair with the first computer program. In FIG. 3, and other drawings illustrating similar exemplary computer programs, the number at the head of each line represents a line number, delimited from the main source code by a colon (:) following the line number. These exemplary computer programs and codes in the first embodiment are pseudocodes mimicking descriptions written in C language, which is a programming language commonly used.

In the exemplary computer program 301 illustrated in (a) in FIG. 3, a function "main" is defined in the first to sixth lines, and a function "funcA" is defined in the eighth to three-hundredth lines. A variable "i" is defined in the second line, and a for loop with a loop variable of the variable i is defined in the third to fifth lines. A loop count of three is defined for the for loop in the third line, and the function "funcA" is called in the fourth line and executed in the loop. In other words, in the computer program 301, the function "funcA" is called and executed three times.

The exemplary computer program 302 illustrated in (b) in FIG. 3 is the same as the computer program 301, except that the loop count defined for the for loop in the third line is five. In the computer program 302, the function "funcA" is called and executed five times.

The computer programs 301 and 302 are input to the analysis information generator 102 via the input unit 101 (Step S201 in FIG. 2). The analysis information generator 102 sets a trace information output terminal to each of the computer programs 301 and 302 (Step S202 in FIG. 2).

The trace information is a piece of information recording a behavior having occurred at particular timing while the computer program is executed. In other words, trace information is a piece of information representing a characterizing quantity that is observed at particular timing while in the computer program is executed. In this embodiment, the trace information is explained to be the information of a start and an end of execution of a function. In this embodiment, the number of occurrences of a start and an end of execution of a function and cycle information representing the cycles at which the start and the end occurs are collected as characterizing quantities. The cycle information also functions as order information that specifies order of the trace information.

To assign an output terminal, for example, the output terminal may be embedded in each of the computer programs 301 and 302 while the computer programs 301 and 302 are complied, so that the trace information is output to the output terminal when the complied computer programs 301 and 302 are executed.

The analysis information generator 102 executes the computer program 301 and the computer program 302, and acquires the program information (Step S203 in FIG. 2). The program information is some information required in executing a computer program. In this embodiment, the input computer programs 301 and 302 themselves are included in the program information, and, in the explanation hereunder, are analyzed as the program information. The analysis information generator 102 collects the trace information for the computer program 301 and the trace information for the computer program 302 from the output terminal assigned in the computer program 301 and the computer program 302 being executed (Step S204 in FIG. 2).

FIG. 4 illustrates examples of the trace information according to the first embodiment. In FIG. 4, (a) illustrates an example of trace information 401 collected from the computer program 301. In FIG. 4, (b) illustrates an example of trace information 402 collected from the computer program 302. To explain using (a) in FIG. 4 as an example, the trace information 401 includes rows of information each row of which contain information of Cycle, Object, and Status delimited by a space, in the order listed herein. The Cycle represents a unit of execution in the computer program 301, for example. The Object represents an object to be traced. The Status describes an operation of the Object to be traced. The delimiter of the information is not limited to a space.

For example, in the trace information 401 illustrated in (a) in FIG. 4, the first line describes "1 main start", indicating that the function "main" was started at Cycle 1. The second line describes "10 funcA start", indicating that the function "funcA" was started at Cycle 10, and the third line describes "110 funcA end", indicating that the function "funcA" was ended at Cycle 110. In the trace information 402 illustrated in (b) in FIG. 4, details of the execution are described in the same manner.

The trace information 401 is collected based on the computer program 301 illustrated in (a) in FIG. 3. In the computer program 301, the for loop containing the function "funcA" is executed three times. The trace information 401 illustrated in (a) in FIG. 4 describes that the function "funcA" was performed three times at Cycle 10, Cycle 120, and Cycle 230.

The trace information 402 is collected based on the computer program 302 illustrated in (b) in FIG. 3. In the computer program 302, the for loop containing the function "funcA" is executed five times. The trace information 402 illustrated in (b) in FIG. 4 describes that the function "funcA" was executed five times at Cycle 10, Cycle 120, Cycle 230, Cycle 340, and Cycle 450. In this manner, when the source code of the computer program is modified, the trace information resulting from the source code becomes different accordingly.

Every time a piece of trace information is collected for the corresponding piece of program information, the analysis information generator 102 generates trace correspondence information that relates the collected trace information to the program information from which the trace information is collected (in this example, a position in the source code) (Step S205 in FIG. 2).

The trace correspondence information relating the program information to the trace information is generated to facilitate users, for example, to look for a piece of information in the source code of the computer program 301 that can be the cause of a particular piece of the trace information.

Users are also enabled to look through the trace information having resulted from the source code of the computer program 301.

Figure 5:
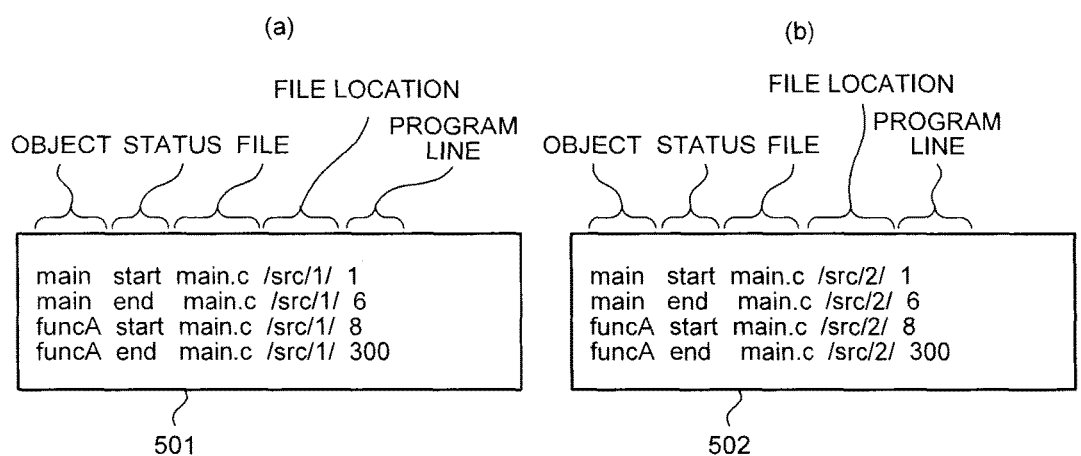
FIG. 5 illustrates examples of trace correspondence information according to the first embodiment.

FIG. 5 illustrates examples of the trace correspondence information according to the first embodiment. In FIG. 5, (a) illustrates an example of trace correspondence information 501 collected from the computer program 301. In FIG. 5, (b) illustrates an example of trace correspondence information 502 collected from the computer program 302. To explain with reference to (a) in FIG. 5, the trace correspondence information 501 has rows of information each row of which contains information of Object, Status, File, File Location, and Program Line each of which is delimited by a space, in the order listed herein. The delimiter of the information is not limited to a space.

The Object and the Status in the trace correspondence information 501 represent the same information as those in the trace information 401 illustrated in (a) in FIG. 4. The File indicates the name of the file storing therein the source code of the computer program 301, which corresponds to the trace correspondence information 501. The File Location indicates the location of the file with the file name. The File Location is specified as a path to the file, for example, and the path does not include the file name in the embodiment. The Program Line indicates the line in the source code of the computer program 301 having caused the operation recorded in the Object and the Status in the trace information 401. The Object and the Status have correspondence relation the Object and the Status to the trace correspondence information 501.

For example, in the program information 501 illustrated in (a) in FIG. 5, the first line describes "main start main.c/src/1/1", which means that the trace information indicating a start of the function "main" appears in the first line of the source code stored in the file "main.c" at the location "/src/1/". In other words, the trace correspondence information 501 states that the operation in the first line of the trace information 401 ("the function "main" was started") appears in the first line of the source code stored in the file "main.c" located at "/src/1/". The second line describes "main end main.c/src/1/6", which means the trace information indicating an end of the function "main" appears in the sixth line of the source code stored in the file "main.c" at the location "/src/1/". In other words, the trace correspondence information 501 states that the operation in the eighth line of the trace information 401 ("the function "main" was completed") appears in the sixth line in the source code stored in the file "main.c" at the location "/src/1/".

In (a) in FIG. 3, the source code in the computer program 301 corresponding to the trace information 401 and the trace correspondence information 501 indicates that the execution of the function "main" is started in the first line, and ended in the sixth line.

Similarly, in the trace correspondence information 502 illustrated in (b) in FIG. 5, the first line describes "main start main.c/src/2/1", which means that the trace information indicating a start of the function "main" appears in the first line of the source code stored in the file "main.c" at the location "/src/2/". In other words, the trace correspondence information 502 states that the operation in the first line of the trace information 402 ("the function "main" was started") appears in the first line of the source code stored in the file "main.c" at the location "/src/2/". The second line describes "main end main.c/src/2/6", which means that the trace information indicating an end of the function "main" appears in the sixth line of the source code stored in the file "main.c" at the location "/src/2/". In other words, the trace correspondence information 502 states that the operation in the twelfth line of the trace information 402 (the "function "main" was ended") appears in the sixth line of source code stored in the file "main.c" at the location "/src/2/".

In (b) in FIG. 3, the source code in the computer program 302 corresponding to the trace information 402 and the trace mapping information 502 indicates that the function "main" is started in the first line, and ended in the sixth line.

With the combination of the program information, the trace correspondence information, and the trace information, the analyzer 103 can find out the position at which a piece of information recorded in the trace information appears in the program information.

The trace information 401 and the trace information 402 generated by the analysis information generator 102 for the respective computer program 301 and computer program 302 are output from the analysis information generator 102 to the analyzer 103. The analyzer 103 passes the received trace information 401 and trace information 402 to the difference information generator 1030. The trace correspondence information 501 and the trace correspondence information 502 generated by the analysis information generator 102, generated for the respective computer program 301 and computer program 302, are also output from the analysis information generator 102 to the analyzer 103. The analyzer 103 also passes the received trace correspondence information 501 and trace correspondence information 502 to the difference information generator 1030. The computer program 301 and the computer program 302, which are part of the program information, are also output from the analysis information generator 102 to the analyzer 103. The analyzer 103 also passes the received computer program information to the difference information generator 1030.

The analyzer 103 summarizes and analyzes these pieces of the trace information, trace correspondence information, and program information. The analyzer 103 then extracts differences in the trace information and differences in the program information. The analyzer 103 then finds out how the former differences have correspondence relations to the latter differences (Steps S206 to S208 in FIG. 2).

For example, consider an example in which the analysis information generator 102 outputs a piece of trace information, a piece of program information, and a piece of trace correspondence information for a specific version of a computer program, and another set of these pieces of information for another version earlier than the specific version of the computer program, and the analyzer 103 is caused to analyze these pieces of information. In this example, the computer program 301 and the computer program 302 correspond to different versions of the same computer program, and the computer program 301 and the computer program 302 behave differently, because the loop count for the for loop has been modified.

In the analyzer 103, the trace difference information generator 10301 extracts differences between the trace information 401 and the trace information 402, which correspond to the computer program 301 and the computer program 302, respectively, that are to be compared, and outputs the differences as trace difference information (Step S206 in FIG. 2).

Figure 6:
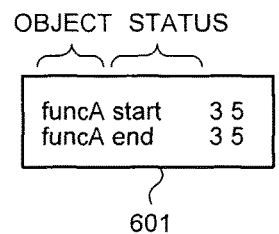
FIG. 6 illustrates an example of trace difference information according to the first embodiment.

FIG. 6 illustrates an example of the trace difference information according to the first embodiment when the computer program 301 and the computer program 302 are compared. In FIG. 6, trace difference information 601 has pairs of Object and Status for which a difference between the trace information 401 and the trace information 402 is extracted. In the example illustrated in FIG. 6, the trace difference information 601 relates a pair of Object (traced object) and Status (behavior of the traced object), for which a difference between the trace information 401 and the trace information 402 is extracted, to a pair of values found to be different in the Object and the Status. In the example illustrated in FIG. 6, the left one of these two values next to the Object and Status pair represents a value in the trace information 401, and the right one represents a value in the trace information 402.

More specifically, in the exemplary trace difference information 601 illustrated in FIG. 6, the first line indicates that the status "start" of the function "funcA" that is an object being traced is captured three times in the trace information 401, and captured five times in the trace information 402. The computer program 301 and the computer program 302 corresponding to the trace information 401 and the trace information 402, respectively, are thus indicated to be different in the number of times at which the process of starting the function "funcA" is executed. Similarly, the second line in the trace difference information 601 indicates that the status "end" of the function "funcA" is captured three times in the trace information 401, and captured five times in the trace information 402. The computer program 301 and the computer program 302 corresponding to the trace information 401 and the trace information 402, respectively, are thus indicated to be different in the number of times at which the process of ending the function "funcA" is executed.

In other words, the computer program 301 specifies to execute the for loop calling the function "funcA" three times, and the computer program 302 specifies to execute the same function five times. Therefore, this difference is extracted by the trace difference information generator 1031 as a piece of the trace difference information 601.

The trace difference information generator 10301 counts the number of occurrences of the status "start" and of the status "end" of the functions "main" and "funcA" in each of the trace information 401 and the trace information 402, and compares the counts. If the count in the trace information 401 is different from the count in the trace information 402, the trace difference information generator 10301 extracts the difference.

In the analyzer 103, the program difference information generator 10300 extracts differences in the pieces of program information being compared (in this embodiment, the computer program 301 and the computer program 302), and outputs the differences as the program difference information (Step S207 in FIG. 2). The program difference information includes information on the presence of differences in the program information and, if the program information has some difference, the program difference information includes information on which parts of the program information are different. Such determinations are made using the program information containing the information required in execution of the computer programs, which are the sources of the trace information being compared.

Figures 7, 8:
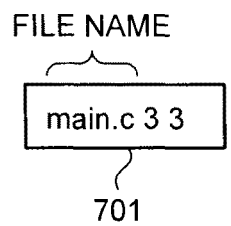
FIG. 7 illustrates an example of program difference information according to the first embodiment.
FIG. 8 illustrates an example of a display screen according to the first embodiment.

FIG. 7 illustrates an example of the program difference information when the computer program 301 and the computer program 302 are the program information according to the first embodiment. The program difference information 701 illustrated in FIG. 7 includes the file name of the computer program 301 and the computer program 302 from which the difference is extracted, and information of the lines in the source codes of the computer program 301 and the computer program 302 from which the differences are extracted. In the example illustrated in FIG. 7, following the file name of the computer program 301 and the computer program 302, a difference in the source codes is indicated as "3 3". The left piece of information represents a line in the source code of the computer program 301, and the right piece of information represents a line in the source code of the computer program 302.

When different file names are used for the computer program 301 and the computer program 302, the program difference information 701 may include a plurality of file names.

More specifically, in the example illustrated in FIG. 7, the description "3 3" in the computer difference information 701 indicates that the difference lies in the third line of the source code of the computer program 301 and in the third line of the source code of the computer program 302 both of which have a file name of "main.c". One can see that, by comparing the source codes of the computer program 301 and the computer program 302 with reference to FIG. 3, while a range of the variable i is specified as "i<3" in the third line of the computer program 301, the same range is specified as "i<5" in the third line in the computer program 302, and a difference is found in this range.

When the source codes of the computer program 301 and the computer program 302 are described as text data, for example, the program difference information generator 10300 can run a function for extracting difference information from text files on the file storing therein the computer programs 301 and 302, so that the differences between the computer program 301 and the computer program 302 are extracted. The program difference information generator 10300 acquires the file name and the locations of the files storing therein the computer programs 301 and 302 from the trace correspondence information 501 and 502, for example.

The correspondence relation analyzer 1031 in the analyzer 103 analyses the trace correspondence information 501 and the trace correspondence information 502 to find some correspondence relations between the program difference information 701 generated by the program difference information generator 10300 and the trace difference information 601 generated by the trace difference information generator 10301 (Step S208 in FIG. 2). The correspondence relation analyzer 1031 makes an analysis on whether any difference in the trace difference information 601 has correspondence relation to a difference in the program information (in this embodiment, the computer program 301 and the computer program 302). If any correspondence relation is found between a difference in the trace difference information 601 and a difference in the computer program 301 and the computer program 302, the correspondence relation analyzer 1031 analyzes which part of the difference in the program information the trace difference information 601 is related.

Explained now is an exemplary analysis performed by the correspondence relation analyzer 1031 when the computer program 301 and the computer program 302 illustrated in FIG. 3 are the programs information to be analyzed. The correspondence relation analyzer 1031 acquires the source codes of the computer program 301 and the computer program 302 containing the parts indicated as being different in the trace difference information 601 in FIG. 6 from the program information.

The correspondence relation analyzer 1031 performs matching on the acquired source codes of the computer programs 301 and 302, based on the program difference information 701 illustrated in FIG. 7, and extracts different parts from the source codes. In the example illustrated in FIG. 7, the correspondence relation analyzer 1031 extracts the third line from the source code of the computer program 301, and extracts the third line from the source code of the computer program 302, as the different parts.

The correspondence relation analyzer 1031 relates the difference information included in the trace difference information 601 to at least one of the pieces of program information (in this embodiment, the computer program 301 and the computer program 302), based on the trace correspondence information 501 and the trace correspondence information 502. In this embodiment, the correspondence relation analyzer 1021 relates the difference information to both of the computer program 301 and the computer program 302.

To follow each step of this process, the correspondence relation analyzer 1031 first establishes a correspondence relation between the trace information and the computer program 301. Looking at the first line of the trace difference information 601, the correspondence relation analyzer 1031 finds out that the trace of the Object "funcA" and the Status "start" matches the Object and the Status in the third line of the trace correspondence information 501 corresponding to the computer program 301. Referring to the trace correspondence information 501, the correspondence relation analyzer 1031 finds a correspondence relation between the first line in the trace difference information 601 and the eighth line in the computer program 301. The correspondence relation analyzer 1031, therefore, establishes a correspondence relation between the difference in the trace information and the eighth line of the computer program 301. Looking at the second line of the trace difference information 601, the correspondence relation analyzer 1031 finds out that the trace of the Object "funcA" and the Status "end" matches the Object and the Status in the fourth line of the trace correspondence information 501 corresponding to the computer program 301. Referring to the trace correspondence information 501, the correspondence relation analyzer 1031 finds a correspondence relation between the second line in the trace difference information 601 and the 300th line of the computer program 301. The correspondence relation analyzer 1031, therefore, establishes a correspondence relation between the difference in the trace information and the 300th line of the computer program 301.

In the same manner, the correlation analyzer 1031 first establishes a correspondence relation between the trace information and the computer program 302. Looking at the first line of the trace difference information 601, the correspondence relation analyzer 1031 finds out the trace of the Object "funcA" and the Status "start" matches the Object and the Status in the third line of the trace correspondence information 502 corresponding to the computer program 302. Referring to the trace correspondence information 502, the correspondence relation analyzer 1031 finds a correspondence relation between the second line in the trace difference information 601 and the eighth line of the computer program 302. The correspondence relation analyzer 1031, therefore, establishes a correspondence relation between the difference in the trace information and the eighth line of the computer program 302. Looking at the second line of the trace difference information 601, the correspondence relation analyzer 1031 finds that the trace of the Object "funcA" and the Status "end" matches the Object and the Status in the fourth line of the trace correspondence information 502 corresponding to the computer program 302. Referring to the trace correspondence information 502, the correspondence relation analyzer 1031 finds a correspondence relation between the second line in the trace difference information 601 and the 300th line of the computer program 302. The correspondence relation analyzer 1031, therefore, establishes a correspondence relation between the difference in the trace information and the 300th line of the computer program 302.

Through this process, it becomes possible to recognize how the computer programs to be analyzed behave differently when they are executed, which configurations are used when the computer programs are executed, and which part of the computer programs have been modified.

Upon completion of the analysis of the program information (in this embodiment, the computer program 301 and the computer program 302), the correspondence relation analyzer 1031 outputs the analysis result to the display information generator 104. The analysis result output to the display information generator 104 includes information, for example, indicating which parts of the source codes of the computer programs 301 and 302 are different, and information indicating which parts of the source codes have resulted in the difference in the trace information.

The correspondence relation analyzer 1031 appends the program information (in this embodiment, the source codes of the computer program 301 and the computer program 302) to the analysis result before outputting the analysis result to the display information generator 104. The correspondence relation analyzer 1031 may also output the trace difference information 601 and the program difference information 701 to the display information generator 104 in addition to the analysis result.

The display information generator 104 generates display information for visualizing the analysis result received from the correspondence relation analyzer 1031. More specifically, the display information generator 104 generates display information for displaying the differences between the trace information 401 and the trace information 402 and the differences in the program information (in this embodiment, the computer program 301 and the computer program 302) in a format that can be easily understood by users, based on the pieces of information received from the correspondence relation analyzer 1031.

For example, in the analysis apparatus 100, the analysis information generator 102 collects the trace information and the program information for a specific version of a computer program and another version that is earlier than the specific version. The analyzer 103 then generates trace difference information and program difference information from the trace information, the program information, and the trace correspondence information, and analyzes the correspondence relations between the trace difference information, the program difference information, and the program information. Based on the analysis result received from the analyzer 103, the display information generator 104 generates display information for displaying the trace information and the program information corresponding to the trace information. The display information displays a modified part of the program information and the part of the trace difference information having a correspondence relation to the modified part in an emphasized manner so that these parts attract user's eyes. In this manner, how a modification in a source code affects the behavior of the computer program is visualized.

The information may be emphasized in any possible ways, including but not limited to, bolding, italicizing, displaying the information in a different color, or displaying in a reversed color with respect to the background color.

FIG. 8 illustrates an example of a display screen based on the display information generated by the display information generator 104 according to the first embodiment. This exemplary display information is generated by the display information generator 104 based on the result of an analysis conducted on the computer program 301 and the computer program 302 illustrated in (a) and (b) in FIG. 3.

In FIG. 8, a display screen 801 that is displayed based on the display information generated by the display information generator 104 includes display areas 810, 811, 812, and 813. Each of the display areas 812 and 813 displays the source code in the program information having been analyzed, and the location of the file storing therein the source code. In the example illustrated in FIG. 8, the file storing therein the source code is displayed in the top frames of the display areas 812 and 813. The source code is displayed in a frame immediately below the frame in which the source code file location is indicated. The display areas 810 and 811 display the line numbers corresponding to the lines of the respective source codes displayed in the display areas 812 and 813.

Because the third lines are extracted from the source codes of the computer program 301 and the computer program 302 as different parts of the program difference information 701, the display information generator 104 generates the display information displaying these third lines in an emphasized manner. In the example illustrated in FIG. 8, the display information generator 104 uses an arrow indicator 820 to point to the third lines so that the third lines are emphasized.

Also emphasized in the display information generated by the display information generator 104 is the eighth lines of the source codes of the computer programs 301 and 302 in which the function "funcA", which is called in the for loop, is started. In the example illustrated in FIG. 8, the eighth lines are surrounded by a dotted-frame 830 so that the eighth lines are emphasized.

Also emphasized in the display information generated by the display information generator 104 in the example illustrated in FIG. 8 is the 300th lines relating to the last line of the function "funcA" in the computer programs 301 and 302. In this example, the 300th lines are surrounded by a dotted-frame 831 so that the 300th lines are emphasized.

In the manner described above, in the first embodiment, using the source codes of the computer programs as the program information, a modified part of the program information, which has related trace information, and the part of the trace difference information corresponding to the modified part are visualized in such a manner that users can easily recognize these parts. The developer of the computer program is thereby allowed to gain a clear view of how a modification in the source code affects the computer program in which part, between different versions of the same computer program, for example.

Other Examples of First Embodiment

In the example explained above, the numbers of lines in the source codes of the computer program 301 and the computer program 302 to be analyzed remain the same, and the codes at the same lines causes processes corresponding to each other to be executed (referred to as a first case). In actual computer programs, it is quite possible that, although the processes performed and results achieved by the source codes are substantially the same, the processes caused to be executed by the codes at corresponding lines do not correspond to each other.

Examples of such cases in which the processes caused to be executed by the codes at corresponding lines do not correspond each other include a case in which a code (line) of the first computer program to be analyzed is deleted from the second computer program to be analyzed (referred to as a second case), and a case in which a code is added to the first computer program to be analyzed to achieve the second computer program to be analyzed (referred to as a third case). In these first, second, and third cases, at least the program difference information is different and the display screen displaying the resultant correspondence relations becomes different accordingly.

To begin with, the second case will be explained with reference to FIGS. 9 to 14. FIG. 9 illustrates examples of computer programs for explaining the second case. In FIG. 9, (a) illustrates an example of the source code of a computer program 901 that is one of the computer programs to be analyzed, and (b) illustrates an example of the source code of a computer program 902 that is the other computer program to be analyzed.

The computer program 901 and the computer program 902 illustrated in (a) and (b) in FIG. 9, respectively, correspond to the computer program 301 and the computer program 302, respectively illustrated in (a) and (b) in FIG. 3. While the loop count in the for loop in (a) and (b) in FIG. 3 is specified as an integer, the loop count in (a) and (b) in FIG. 9 is specified with a variable "max". The computer program 901 and 902 both perform a process of calling the function "funcA" in a for loop, in the same manner as in the computer program 301 and the computer program 302.

In the exemplary computer program 901 illustrated in (a) in FIG. 9, the function "main" is defined in the first to eighth lines, the ninth line is kept blank, and the function "funcA" is defined in the 10th to 300th lines. In the computer program 901, the variable "max" is defined in the second line, the variable i is defined in the third line, and the operation of "max=max−2" is defined in the fourth line. Defined in the fifth to seventh lines of the computer program 901 is a for loop with a loop variable set to the variable i and with a loop count determined by the variable "max". The operation in the fourth line determines a loop count of three. In the loop of the computer program 901, the function "funcA" is called and executed in the sixth line.

In the exemplary computer program 902 illustrated in (b) in FIG. 9, the operation with the variable "max" in the fourth line of the computer program 901 is deleted, and the code of the computer program 901 kept unchanged in the fifth line and thereafter is carried up to the fourth line and thereafter. In the computer program 902, the loop count in the for loop is changed to five based on the variable "max". Furthermore, because a line is deleted from the computer program 901, the 299th line is the last line in the computer program 902.

In FIG. 10, (a) and (b) illustrate examples of trace information for the respective computer program 901 and the computer program 902 illustrated in (a) and (b) in FIG. 9, respectively, according to the first embodiment. In FIG. 10, (a) illustrates an example of trace information 1001 collected from the computer program 901. In the computer program 901, because the loop calling the function "funcA" is executed three times in the same manner as in the computer program 301, the resultant trace information 1001 is identical to the trace information 401 illustrated in (a) in FIG. 4 collected from the computer program 301. In FIG. 10, (b) illustrates an example of trace information 1002 collected from the computer program 902. The trace information 1002 is also identical to the trace information 402 illustrated in (b) in FIG. 4 collected from the computer program 302, in the same manner as the trace information 1001.

Figure 11:
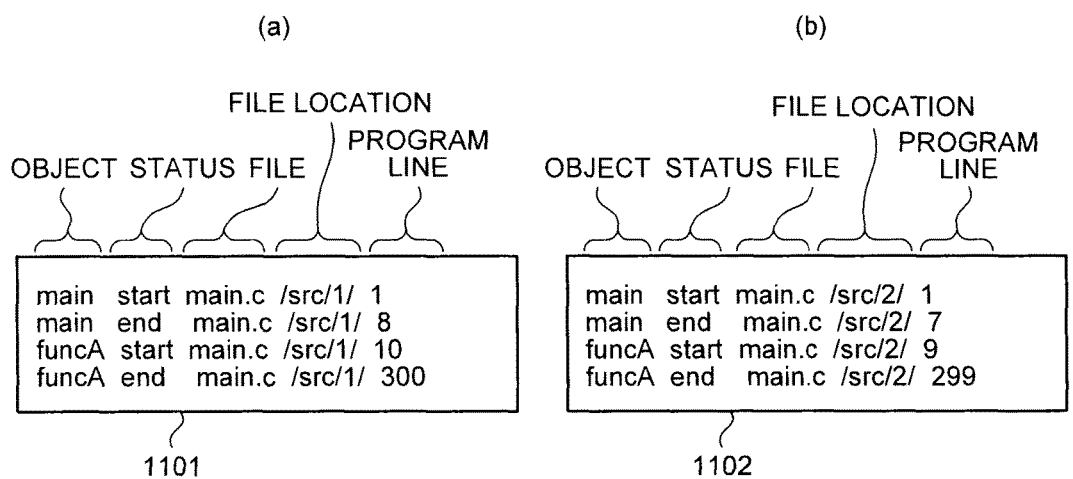
FIG. 11 illustrates examples of trace correspondence information in the second case according to the first embodiment.

In FIG. 11, (a) and (b) illustrate examples of trace correspondence information corresponding to the computer program 901 and the computer program 902, respectively illustrated in (a) and (b) in FIG. 9, according to the first embodiment. In FIG. 11, (a) and (b) illustrate exemplary trace correspondence information 1101 and trace mapping information 1102 collected from the computer program 901 and the computer program 902, respectively. The computer program 901 is different from the computer program 301 in that the total numbers of lines are different, and the function "funcA" is positioned at different lines. The trace correspondence information 1101 becomes different accordingly, from the trace correspondence information 501 in having different Program Line values indicating the lines in which a start of the function "funcA" and the end of the function "main" are traced in the trace information 1001. In the same manner, the computer program 902 is different from the computer program 302 in that the total numbers of lines are different and the function "funcA" is positioned at different lines. The trace correspondence information 1102 becomes different accordingly, from the trace correspondence information 501 in having different Program Line values indicating the lines in which a start of the function "funcA" and the end of the function "main" are traced in the trace information 1002.

Figure 12:
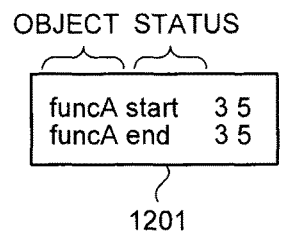
FIG. 12 illustrates an example of trace difference information in the second case according to the first embodiment.

FIG. 12 illustrates an example of trace difference information when the computer program 901 and the computer program 902 are to be analyzed in the first embodiment. As mentioned earlier, the trace information 1001 and the trace information 1002 corresponding to the computer program 901 and the computer program 902, respectively, are identical to the trace information 401 and the trace information 402 corresponding to the computer program 301 and computer program 302, respectively. As a result, trace difference information 1201 illustrated in FIG. 12 becomes identical to the trace difference information 601, which is based on the computer program 301 and the computer program 302.

Figure 13:
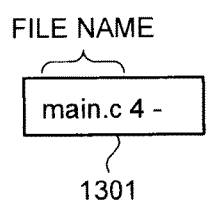
FIG. 13 illustrates an example of program difference information in the second case according to the first embodiment.

FIG. 13 illustrates an example of the program difference information when the computer program 901 and the computer program 902 are analyzed as the program information in the first embodiment. In this example, one can see, by comparing (a) and (b) in FIG. 9, that the computer program 902 is different from the computer program 901 in that the source code of the computer program 902 does not have "max=max−2" which is found in the fourth line of the source code of the computer program 901.

In the program difference information 1301 illustrated in FIG. 13, the difference in the source codes is described as "4-", accordingly. This description indicates that the fourth line is the difference between the source codes of the computer program 901 and the computer program 902, and the source code of the computer program 902 has no code corresponding to the fourth line in the source code of the computer program 901.

Figure 14:
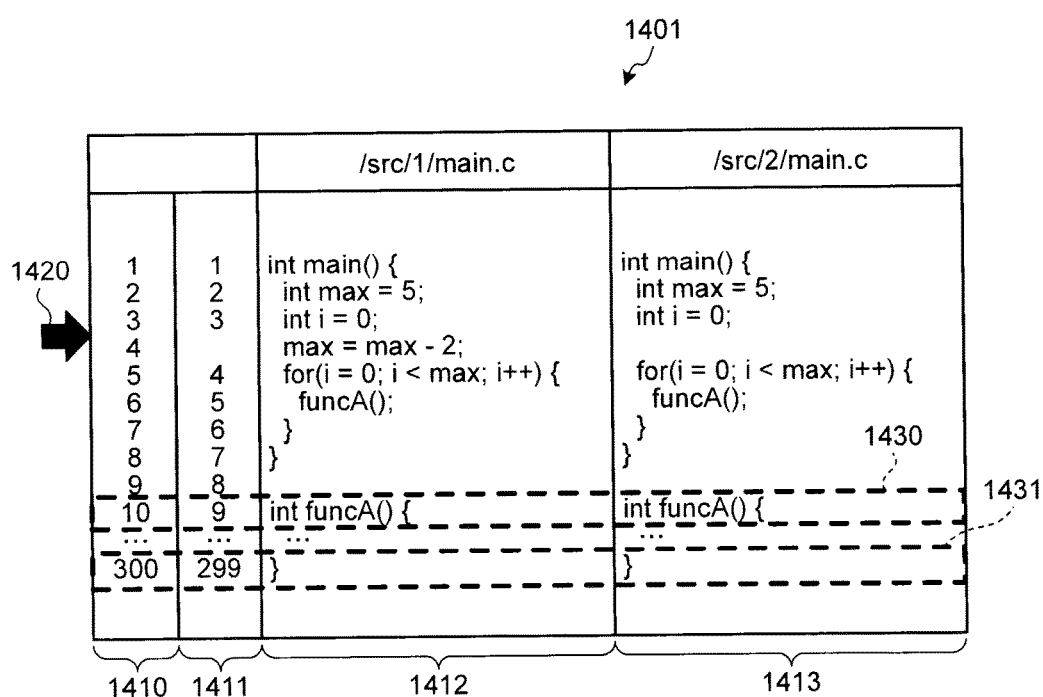
FIG. 14 illustrates an example of a display screen in the second case according to the first embodiment.

FIG. 14 illustrates an example of a display screen generated for the computer program 901 and the computer program 902 by the display information generator 104 based on the display information in the first embodiment. This display screen 1401 illustrated in FIG. 14 includes display areas 1410, 1411, 1412, and 1413 corresponding to the display areas 810, 811, 812, and 813, respectively, illustrated in FIG. 8. Because the meanings of an arrow indicator 1420 and dotted-frames 1430 and 1431 illustrated in FIG. 14 are the same as those of the arrow indicator 820 and the dotted-frames 830 and 831 in FIG. 8, detailed explanations thereof are omitted herein.

In this example, the program difference information 1301 indicates that the fourth line is the difference between the computer program 901 and the computer program 902, and the computer program 902 has no code corresponding to the fourth line of the computer program 901. A blank line is accordingly displayed at a position corresponding to the fourth line in the display area 1413 for displaying the source code of the computer program 902 in the display screen 1401, to indicate that the source code has no code corresponding to the fourth line of the computer program 901. The blank line is also inserted so that the codes corresponding to each other are displayed at the same line in the display areas 1412 and 1413. The arrow indicator 1420 is also displayed in the display screen 1401 at a position corresponding to the fourth line of the computer program 901 to further emphasize that the computer program 901 has no line corresponding to the fourth line of the computer program 902.

The third case will now be explained with reference to FIGS. 15 to 20. FIG. 15 illustrates examples of computer programs for explaining the third case. In FIG. 15, (a) illustrates an example of the source code of a computer program 1501 that is one of the computer programs to be analyzed, and (b) illustrates an example of the source code of a computer program 1502 that is the other computer program to be analyzed.

The computer program 1501 and the computer program 1502 illustrated in (a) and (b) in FIG. 15, respectively, correspond to the computer program 301 and the computer program 302, respectively illustrated in (a) and (b) in FIG. 3. While the loop count in the for loop in (a) and (b) in FIG. 3 is specified as an integer, the loop count in (a) and (b) in FIG. 15 is specified with a variable "max". The computer program 1501 and the computer program 1502 both perform a process of calling the function "funcA" in a for loop, in the same manner as the computer program 301 and the computer program 302.

The computer program 1501 illustrated in (a) in FIG. 15 is identical to the computer program 902 illustrated in (b) in FIG. 9. In other words, the computer program 1501 has 299 lines in total, and calls the function "funcA" from a for loop with a loop count of five. The source code of the computer program 1502 illustrated in (b) in FIG. 15 results from inserting a line of the operation "max=max−2" between the third line and the fourth line of the source code of the computer program 1501. The resultant computer program 1502 is identical to the computer program 901 illustrated in (a) in FIG. 9. In other words, the computer program 1502 has 300 lines in total, and calls the function "funcA" in the for loop with a loop count of three.

In FIG. 16, (a) and (b) illustrate examples of trace information corresponding to the computer program 1501 and the computer program 1502 illustrated in (a) and (b) in FIG. 15, respectively, in the first embodiment. In FIG. 16, (a) illustrates an example of trace information 1601 collected from the computer program 1501. Because the computer program 1501 is identical to the computer program 902, the resultant trace information 1601 becomes the same as the trace information 1002 corresponding to the computer program 902. The exemplary trace information 1602 illustrated in (b) in FIG. 16 collected from the computer program 1502 is also identical to the trace information 1001 collected from the computer program 901 because the computer program 1502 is identical to the computer program 901.

Figure 17:
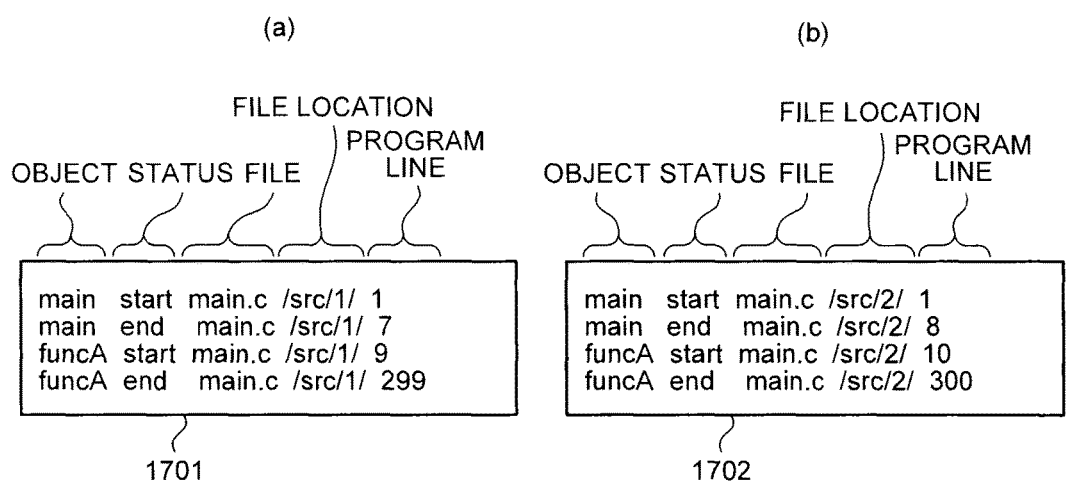
FIG. 17 illustrates examples of trace correspondence information in the third case according to the first embodiment.

In FIG. 17, (a) and (b) illustrate examples of trace correspondence information corresponding to the respective computer program 1501 and the computer program 1502 illustrated in (a) and (b) in FIG. 15 in the first embodiment. In FIG. 17, (a) illustrates an example of trace correspondence information 1701 collected from the computer program 1501. Because the computer program 1501 is identical to the computer program 902, the resultant trace correspondence information 1701 becomes identical to the trace correspondence information 1102 corresponding to the computer program 902 (except for the File Location). The exemplary trace correspondence information 1702 illustrated in (b) in FIG. 17 collected from the computer program 1502 is also identical to the trace correspondence information 1101 collected from the computer program 901, because the computer program 1502 is identical to the computer program 901.

Figure 18:
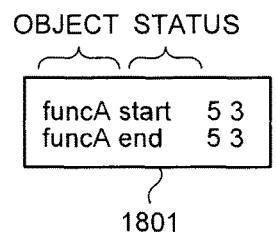
FIG. 18 illustrates an example of trace difference information in the third case according to the first embodiment.

FIG. 18 illustrates an example of the trace difference information when the computer program 1501 and the computer program 1502 are to be analyzed in the first embodiment. In this example, the computer program 1501 has a loop count of five in the for loop, whereby calling the function "funcA" five times, and the computer program 1502 has a loop count of three in the for loop, whereby calling the function "funcA" three times. Therefore, the left one of the two numbers following the Object and Status pair in the trace difference information 1801 in FIG. 18 is extracted from the trace information 1601 and is five, while the right one is extracted from the trace information 1602 and is three.

Figures 19, 20:
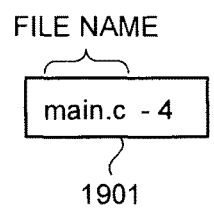
FIG. 19 illustrates an example of program difference information in the third case according to the first embodiment.
FIG. 20 illustrates an example of a display screen in the third case according to the first embodiment.

FIG. 19 illustrates an example of the program difference information when the computer program 1501 and the computer program 1502 are to be analyzed. In this example, one can see, by comparing (a) and (b) in FIG. 15, that the computer program 1501 is different from the computer program 1502 in that the source code "max=max−2" is inserted between the third line and the fourth line of the computer program 1501. In other words, the computer program 1501 does not have any line corresponding to the fourth line of the source code of the computer program 1502.

In the program difference information 1901 illustrated in FIG. 19, the difference in the source codes is described as "−4", accordingly. This description indicates that the fourth line of the source code is the difference between the source codes of the computer program 1502 and the computer program 1501, and the source code of the computer program 1501 has no code corresponding to the fourth line of the source code of the computer program 1502.

FIG. 20 illustrates an example of a display screen generated by the display information generator 104 based on the display information for the computer program 1501 and the computer program 1502. In FIG. 20, this display screen 2001 includes display areas 2010, 2011, 2012, and 2013 corresponding to the respective display areas 810, 811, 812, and 813 illustrates in FIG. 8. Because the meanings of an arrow indicator 2020 and dotted-frames 2030 and 2031 illustrated in FIG. 20 are the same as those of the arrow indicator 820 and the dotted-frames 830 and 831 in FIG. 8, detailed explanations thereof are omitted herein.

In this example, the program difference information 1901 indicates that the fourth line is the difference between the computer program 1501 and the computer program 1502, and the computer program 1501 has no code corresponding to the fourth line in the computer program 1502. A blank line is accordingly displayed at a position corresponding to the fourth line in the display area 2012 for displaying the source code of the computer program 1501 in the display screen 2001, whereby indicating that the source code has no code corresponding to the fourth line of the computer program 1502. The blank line is also inserted so that the codes corresponding to each other are displayed in the same lines in the display areas 2012 and 2013. The arrow indicator 2020 is also displayed at a position corresponding to the fourth line of the computer program 1502 in the display screen 2001 to further emphasize that the computer program 1501 has no line corresponding to the fourth line of the computer program 1502.

Possible Hardware Configuration in First Embodiment

Figure 21:
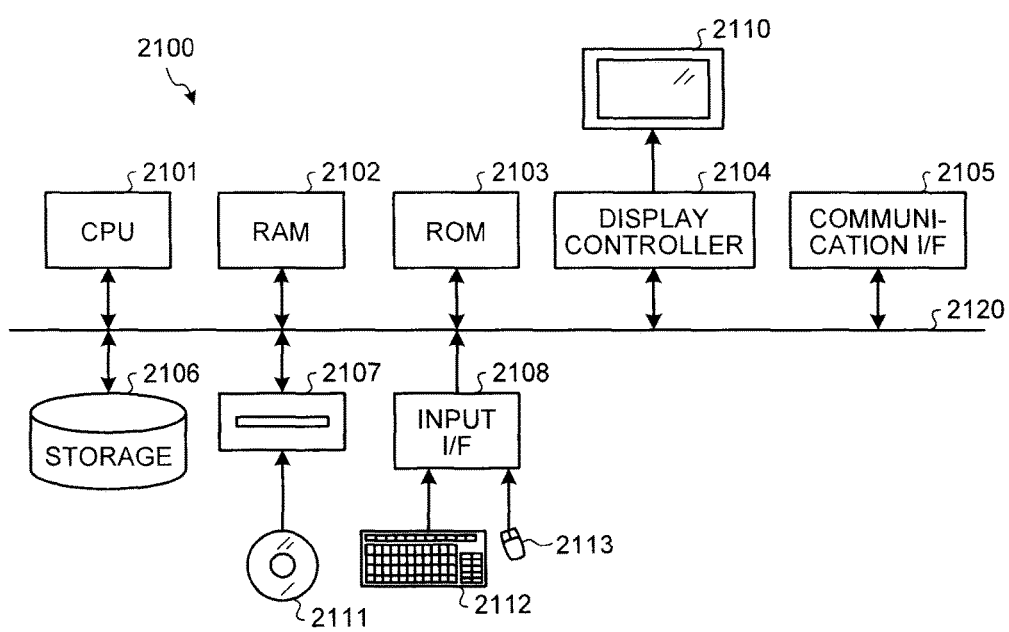
FIG. 21 is a block diagram of a configuration capable of implementing the analysis apparatus according to the first embodiment.

A configuration that can be used for implementing the analysis apparatus 100 according to the first embodiment will now be explained with reference to FIG. 21. As illustrated in FIG. 21, the analysis apparatus 100 can be implemented with a general computer 2100, for example.

In FIG. 21, a central processing unit (CPU) 2101, a random access memory (RAM) 2102, a read-only memory (ROM) 2103, a display controller 2104, and a communication interface (I/F) 2105 are connected to a bus 2120. A storage 2106, a drive device 2107 and an input I/F 2108 are also connected to the bus 2120.

The CPU 2101 controls the entire computer 2100 in accordance with computer programs stored in the ROM 2103 or the storage 2106, using the RAM 2102 as a working memory. The display controller 2104 converts display control signals generated by the CPU 2101 into a format that can be displayed on a display device 2110, and outputs the display control signals to the display device 2110.

The storage 2106 is, for example, a non-volatile semiconductor memory or a hard disk drive, and stores therein computer programs executed by the CPU 2101 and data used in the computer programs. A removable storage medium 2111 can be mounted on the drive device 2107, and the drive device 2107 is capable of at least reading data from the storage medium 2111. Examples of the storage medium 2111 that can be mounted on the drive device 2107 includes disk storage media such as a compact disc (CD), a digital versatile disc (DVD), and a flexible disk, and readable and writable non-volatile semiconductor memories.

The input I/F 2108 receives data inputs from the external. The input I/F 2108 has a given interface such as a Universal Serial Bus (USB) or an Institute of Electrical and Electronics Engineers (IEEE) 1394, and receives data inputs from external devices via the interface. Input devices such as a keyboard 2112 and a mouse 2113 are connected to the input I/F 2108. A user can give instructions to the computer 2100 by making operations on the input devices, in response to a display displayed on the display device 2110, for example.

The communication I/F 2105 establishes communications with external communication networks over predetermined protocols.

The input unit 101, the analysis information generator 102, the analyzer 103, and the display information generator 104 in the analysis apparatus 100 are implemented by a computer program (hereinafter, referred to as an analysis program) operating on the CPU 2101. The computer programs to be analyzed are created on other computers, and stored in a file, stored in the storage medium 2111, and provided to the computer 2100, for example. The computer program may be provided to the computer 2100 from the external over a network, but without limitation. The computer program provided to the computer 2100 is received by the input unit 101, and stored in the storage 2106 or the RAM 2102, for example.

The analysis program for executing the operation of the analysis apparatus 100 according to the first embodiment is provided, as a computer program product, in a manner, but not limited to, stored in a computer-readable storage medium 2111 such as a CD, a flexible disk, or a DVD, as a file in an installable or executable format. The analysis program according to the first embodiment may also be provided, as a computer program product, to the computer 2100 in a manner stored in the ROM 2103 in advance.

Furthermore, the analysis program according to the first embodiment may be stored in a computer connected to a network such as the Internet or a local area network (LAN), and may be provided to the computer 2100 by causing the computer 2100 to download the analysis program over the network. Furthermore, the analysis program according to the first embodiment may be transmitted or distributed over a network such as the Internet.

The analysis program according to the first embodiment has a modular configuration including the units described above (the input unit 101, the analysis information generator 102, the analyzer 103, and the display information generator 104), and in the actual hardware, for example, the CPU 2101 is caused to read the analysis program from the storage 2106 and to execute the analysis program, whereby loading and generating these units on the RAM 2103.

In one example, the CPU 2101 causes the analysis information generator 102 to generate the trace information, the trace correspondence information, and the program information based on the computer programs to be analyzed received by the input unit 101, and stores the generated trace information, trace correspondence information, and program information in the storage 2106 or the like. The CPU 2101 then causes the analyzer 103 to generate the trace difference information and the program difference information based on the trace information, the trace correspondence information, and the program information stored in the storage 2106. The CPU 2101 then causes the analyzer 103 to analyze the correspondence relations between the generated trace difference information and program difference information, and causes the display information generator 104 to generate the display information for visualizing the difference between the analyzed computer programs based on the analysis result and the program information (for example, the source codes) stored in the storage 2106. The generated display information is then passed to the display controller 2104. The display controller 2104 converts the display information into a format that can be displayed on the display device 2110, and sends the display information to the display device 2110, so that a display is made based on the display information.

In the configuration explained above, the input unit 101, the analysis information generator 102, the analyzer 103, and the display information generator 104 are explained to operate on one computer 2100, but the configuration is not limited thereto. For example, one or more of the input unit 101, the analysis information generator 102, the analyzer 103, and the display information generator 104 may operate on different computers.

Modifications of First Embodiment

The following describes some modifications of the first embodiment. In the description below, the computer program 301 and the computer program 302 will be used as an example, among the computer programs 301 and 302, 901 and 902, and 1501 and 1502 explained above.

To begin with, a modification related to the computer programs input to the analysis apparatus 100 via the input unit 101 will now be explained. In the embodiment described above, the computer program 301 and the computer program 302 are explained to be text data described in C language or Java (registered trademark) language, and each of these computer programs 301 and 302 is stored in one file, but the computer programs 301 and 302 are not limited thereto. For example, the analyzed computer programs by the analysis apparatus 100 may be described in any programming language specific to a particular processing apparatus, or in a combination of a plurality of programming languages. Furthermore, the data format of the computer programs is not limited to the text data, and may be a binary format having been compiled by some compiler, and capable of being executed on a particular computer. The computer programs may also have an intermediate data format used by compilers or the like, or may be in a format resultant of conversion to an assembly language, for example.

In the manner described above, the computer programs analyzed by the analysis apparatus 100 may be in any format as long as the computer programs can be converted into some format from which the trace information can be output. Furthermore, the entire information of the analyzed computer programs does not need to be stored in one file, and may be divided and stored in a plurality of files.

Explained now is another modification related to the program information acquired by the analysis information generator 102 while the computer programs are being executed. In the embodiment explained above, the analysis information generator 102 acquires the computer program 301 and the computer program 302 as the program information, but the program information is not limited thereto.

The program information may include, for example, information that identifies the location at which the computer programs are stored, or a server storing therein the files of the computer programs, instead of the computer programs themselves, and the analysis information generator 102 may perform a difference analysis on the source codes referred from such a location or server. Furthermore, the analysis information generator 102 may provide the program information with additional information such as information of the hardware and the operation system on which the computer programs are executed, information of the time at which the computer programs are executed, and information about inputs given to the computer programs.

Furthermore, when the analysis apparatus 100 is used for a plurality of versions of a computer program, the analysis information generator 102 may append version-specific information such as an identification (ID) number issued by a computer program management system to the computer programs before generating the program information. Furthermore, the data format of the program information is not limited to text data, and may be kept in any other format including, but not limited to, a format stored in some existing database. In the manner described above, the program information may have any format as long as a change in the program information can be detected in a manner related with a change in the trace information.

The following describes some modifications related to the trace information that the analysis information generator 102 acquires from the computer programs to be analyzed. In the embodiment described above, the analysis information generator 102 collects traces of executions of the computer programs at particular timing as the trace information 401 and 402, but the information collected as the trace information is not limited thereto. For example, the analysis information generator 102 may collect information related to which part of the computer programs, e.g., a function or a block, is executed for how long at what timing as the trace information. The analysis information generator 102 may also collect such information related to the operating system.

The analysis information generator 102 may also collect information related to memory utilization as the trace information. Examples of the information related to memory utilization includes information such as which part of the computer programs accesses which memory, how much memory is utilized at which timing, and at which timing the memory is fetched or released.

The analysis information generator 102 may also collect the actual values stored in the variables or the like at particular timing while the computer programs that are subject of the analysis are being executed as the trace information. The analysis information generator 102 may also collect information indicating which other computer programs designed to execute the computer programs to be analyzed is executing the computer programs, while the computer programs being analyzed is being executed, or operation information collected from the hardware on which the computer programs are running as the trace information. The trace information collected by the analysis information generator 102 may be in any format as long as such information related to the program information can be collected while the computer programs that are the subject of an analysis is being executed.

In the examples described above, the cycle information included in the trace information may be used as information indicating the order. For example, referring to the cycle information of the trace information 401 illustrated in (a) in FIG. 4, the respective units of execution (for example, the respective functions) in the computer program 301 are executed in ascending order of the value of the cycle. Although the cycle information is used as the order information in this example, the numbers obtained by sequentially numbering the respective units of execution may be used as the order information. The order information can have any form if it is possible to specify the order of the units of execution in the trace information.

The trace information may be also represented as a tree structure. FIG. 22 illustrates conceptual diagrams of the trace information represented as tree structures. In FIG. 22, (a) illustrates an example of a tree structure corresponding to the cycle information 401 illustrated in (a) in FIG. 4. Referring to the computer program 301 illustrated in (a) in FIG. 3, which corresponds to the trace information 401, the function "funcA" is called in the function "main", and these functions have a parent-child relation in which the function "main" is a parent and the function "funcA" is a child.

The trace information 401 in (a) in FIG. 4 can be represented as a tree structure as illustrated in (a) in FIG. 22 by using the parent-child relation of the functions. In (a) in FIG. 22, a node 2201 represents the function "main" being a parent; nodes $2202_{10}$, $2202_{11}$, and $2202_{12}$ each represent the function "funcA" being a child. In (a) in FIG. 22, the single function "main" linked to the three functions "funcA" indicates that the function "funcA" is called three times in the function "main".

In FIG. 22, (b) illustrates an example of a tree structure corresponding to the trace information 402 illustrated in (b) in FIG. 4. Referring to the computer program 302 illustrated in (b) in FIG. 3, which corresponds to the trace information 402 in (b) in FIG. 4, similarly to the computer program 301 in (a) in FIG. 3, the function "funcA" is called in the function "main", and these functions have a parent-child relation in which the function "main" is a parent and the function "funcA" is a child. Accordingly, similarly to the example illustrated in (a) in FIG. 22, the trace information 402 can be represented as the tree structure as illustrated in (b) in FIG. 22.

In the example illustrated in (b) in FIG. 22, a node 2201 that represents the function "main" being a parent is linked to nodes $2202_{20}$, $2202_{21}$, $2202_{22}$, $2202_{23}$, and $2202_{24}$ that each represent the function "funcA" being a child. This indicates that the function "funcA" is called five times in the function "main".

In the above manner that represents the trace information as a tree structure, a variety of information such as the start cycle of the function and the end cycle of the function may be stored in each node of the tree. The information to be stored in the node can be of any type if it is possible to be collected as the trace information. In the example described above, a number of child nodes corresponding to how often the child node is called in the parent node are created. However, multiple functions are represented as a single node with information indicating the number of calling if they are the same as each other. In this way, the manner of establishing nodes in a tree structure of the trace information is not limited if their parent-child relation is clear and the nodes are consistent with each other.

In the embodiment described above, the analysis information generator 102 assigns an output terminal to the computer programs to allow the trace information to be output, but the way in which the analysis information generator 102 acquires the trace information is not thereto. There are many other possible ways, of which examples include using an output mechanism provided to the hardware, using an output mechanism provided to the operating system, using a function outputting information in response to an input to a computer program, and using a trace information collection mechanism specific to the analysis apparatus 100 according to the first embodiment. The way in which the information is acquired is not especially limited as long as such information usable as the trace information can be collected.

In the example illustrated in (a) and (b) in FIG. 4, the trace information 401 and 402 is explained to be retained as text data, but the data format is not limited thereto. For example, the analysis information generator 102 may retain the trace information in any other format including, but not limited to, a format stored in some existing database.

The following describes some modifications related to the trace correspondence information acquired from the analyzed computer programs. In the embodiment described above, the analysis information generator 102 acquires the Object and the Status from the trace information 401 and the trace information 402, and the file names of the computer program 301 and the computer program 302, the location of the files, and the positions in the source codes stored in the files as the trace correspondence information 501 and 502, but the trace correspondence information is not limited thereto.

The analysis information generator 102 may additionally acquire, for example, some information for identifying a server or the like storing therein the files in which the computer programs are stored as file locations, as a part of the trace correspondence information. The analysis information generator 102 may also acquire information of functions included in the files storing therein the computer programs as a part of the trace correspondence information. The analysis information generator 102 may also acquire information related to the hardware and the operating system on which the computer programs are executed, and information related to inputs given to the computer programs, as a part of the trace correspondence information, in a manner suitable for the program information provided to the analysis information generator 102.

Furthermore, in the embodiment described above, the analysis information generator 102 uses the file name and the file location to describe which part of the source code has resulted in the trace information, but without limitation. For example, the analysis information generator 102 may use only a file name without using a file location, or use any other format indicating a specific section of the source code, such as a function name, a class name, or a method name, to describe the part of the source code having resulted in the trace information.

The analysis information generator 102 may also append version-specific information such as an identification (ID) number issued by a computer program management system to the information such as a file name in the trace correspondence information, when the analysis apparatus 100 is executed on a plurality of versions of a computer program. The trace correspondence information may include any other information that can somehow lead to establishment of a correspondence relation between the trace information and the computer program information, and of which format is not especially limited.

In the examples illustrated in (a) and (b) in FIG. 5, the trace correspondence information 501 and 502 is explained to be retained as text data, but the data format is not limited thereto. For example, the analysis information generator 102 may retain the trace correspondence information in any other format including, but not limited to, a format stored in some existing database.

The following describes some modifications of the way in which the program information, the trace information, and the trace correspondence information are output and how an output is appended. In the embodiment described above, the analysis information generator 102 is caused to execute the computer programs, and to collect the program information, the trace correspondence information, and the trace information, but the way in which these pieces of information are collected is not limited thereto. The information may be collected in any way as long as information equivalent to the program information, the trace information, and trace correspondence information can be collected.

The analysis apparatus 100 may, for example, include some information output from a development-related tool used in the development of the computer programs as the program information, or use such information to collect the trace correspondence information and the trace information. The analysis apparatus 100 may also use such tools to output the program information, the trace correspondence information, or the trace information. Furthermore, when the analysis apparatus 100 is implemented as a computer program executed on a computer, the program information, the trace correspondence information, and the trace information may be collected on another computer, and input to the analysis apparatus 100.

The analysis apparatus 100 may be permitted to collect the entire information that can be collected as the program information, the trace correspondence information, and the trace information, or some restrictions may be imposed on the information of which collection is permitted so that the analysis apparatus 100 can only collect the program information, the trace correspondence information, and the trace information in a selective manner. The analysis apparatus 100 may also collect the program information, the trace correspondence information, and the trace information over the entire period for which the analyzed computer programs are executed, or over a given period for which the computer programs are executed.

In the embodiment described above, the analysis information generator 102 stores the program information, the trace correspondence information, and the trace information in separate files, but storage of the information is not limited thereto. The analysis information generator 102 may store the program information, the trace correspondence information, and the trace information in one file, or may divide the program information, the trace correspondence information, and the trace information into smaller units and store these units in separate files.

The following describes some modifications related to the computer programs input to the analysis apparatus 100 via the input unit 101. In the embodiment described above, different versions of the same computer program is input to the analysis apparatus 100, but computer programs input to the analysis apparatus 100 are not limited thereto. For example, a computer program and another computer program having resulting from a derivational development performed on the computer program may be input to the analysis apparatus 100. The analysis apparatus 100 may also receive inputs of similar computer programs or completely different computer programs. The analysis apparatus 100 may also receive inputs of intermediate codes such as an abstract syntax tree (AST) or executable binary codes of the computer programs to be analyzed, instead of the source codes of such computer programs.

In the embodiment described above, the number of the computer programs analyzed by the analysis apparatus 100 is two, but may be three or more without limitation. For example, when the number of analyzed computer programs is three, the analysis apparatus 100 may first select a first computer program and a second computer program, among the first, the second, and the third computer programs, and analyze the correspondence relation in the manner described above. The analysis apparatus 100 may then select the first computer program and the third computer program, and analyze the correspondence relation in the same manner. Without limitation to such pairing, the analysis apparatus 100 may select every pair of the computer programs, analyze the correspondence relation for each pair, and use the result of the entire analyses. Furthermore, the analysis apparatus 100 may perform an analysis only on some of the computer programs selected in some ways, e.g., on a particular combination selected by a user. The analysis apparatus 100 may perform analyses on program information other than the source codes of the computer programs.

In the embodiment described above, the analysis apparatus 100 analyses the correspondence relation using the computer programs to be analyzed, the program information extracted from the computer programs, the trace information, and the trace correspondence information, but the information used in the analysis is not limited thereto. The analysis apparatus 100 may also use other pieces of information in addition to those listed above. For example, the analysis apparatus 100 may perform an analysis using other information related to the computer programs to be analyzed, e.g., information output from a source code management tool, a project management tool, a debugger, a test management tool, a bug management tool, a code reviewer tool, and a code analysis tool, in addition to the information listed above. The analysis apparatus 100 may use any type of information, without limitation, with which a correspondence relation between the trace information and the program information can be established.

In the example illustrated in FIG. 6, the trace difference information 601 is retained as text data, but the data format is not limited thereto. The trace difference information generator 10301 may also retain the trace difference information in any other format including, but not limited to, a format stored in some existing database.

The following describes some modifications of the way in which the trace difference information is generated by the trace difference information generator 10301. In the embodiment described above, the trace difference information generator 10301 compares the entire trace information 401 and trace information 402, counts the occurrences of an operation being traced, and uses the difference as the trace difference information, but the way in which the trace difference information is generated is not limited thereto.

The trace difference information generator 10301 may, for example, count pieces of predetermined execution information within a certain range of the computer programs to be analyzed, e.g., a section in which a selected function is executed, and acquire the difference as the trace difference information. The trace difference information generator 10301 may also acquire order information indicating the order in which these pieces of execution information have occurred as a part of the execution information, and then acquire, if any difference is detected, a difference in the order in which the pieces of execution information have occurred as the trace difference information.

The trace difference information generator 10301 may also provide the execution information with type information indicating predetermined types of the execution information, e.g., execution timing of a memory access or a function, or some event on the hardware. This type information allows the trace difference information generator 10301 to extract the difference in the type information when different types of execution information occur at the same timing, and to acquire the difference as the trace difference information. In this modification, the display information generator 104 is also allowed to generate display information correspondingly to the types. The trace difference information generator 10301 may also apply a threshold on the difference determined and acquired as the trace difference information, without limitation to extracting the exact difference as the trace information, or may acquire difference information only from a specified part of the trace information.

When using the order information, the trace difference information generator 10301 also may compare the cycle information that is the order information in the trace information 401 illustrated in (a) in FIG. 4 with the cycle information that is the order information in the trace information 402 illustrated in (b) in FIG. 4 to acquire the trace different information. In the examples of (a) and (b) in FIG. 4, the trace information 401 and the trace information 402 are different from each other in the number of each of "funcA start" and "funcA end" and in the cycle information in each line larger than the seventh line (while the contents of the cycle information in the first to the seventh lines are the same). Based on this difference, the trace difference information generator 10301 can extract the trace difference information.

The trace difference information generator 10301 can acquire the trace difference information even if the trace information is treated as a tree structure as illustrated in (a) and (b) in FIG. 22. In this case, the trace difference information generator 10301 acquires the trace difference information by referring to parent-child relation information that indicates the number of nodes and paths and another information of each node on the tree structure of the trace information, for example.

For example, in the examples of (a) and (b) in FIG. 22, the number of the nodes of the function "funcA" linked to the node 2201 of the function "main" is three of the nodes $2202_{10}$ to $2202_{12}$ in the example of (a) in FIG. 22, and is five of the nodes $2202_{20}$ to $2202_{24}$ in the example of (b) in FIG. 22, that is, these examples are different in the number of the child nodes. Based on this difference of the nodes, the trace difference information generator 10301 can extract the trace difference information 601 as illustrated in FIG. 6.

The difference may be detected any way without limitation, as long as the differences can be automatically detected from the trace information to be analyzed, and a difference can be related to a specific piece of the trace information.

The following describes some modifications of the way in which the program difference information generator 10300 generates the program difference information. In the embodiment described above, the program difference information generator 10300 compares the source codes of the computer programs 301 and 302 themselves to generate the program difference information, but the way in which the program difference information is generated is not limited thereto. The analysis apparatus 100 may also use, for example, some existing tool designed for detecting a differences in pieces of text data or source codes of computer programs, to acquire information serving as the program difference information.

When some information in the program information known to be irrelevant to any difference in the trace information is collected as a difference, the program difference information generator 10300 may remove such irrelevant information from the program difference information. Examples of such information known to be irrelevant include comments, spaces, and blank lines included in the source codes. The information in the program information excluding the source codes may be converted into a text having a unified format in advance, so that the program difference information generator 10300 can extract the differences between the pieces of text information corresponding to the computer program 301 and the computer program 302 as the program difference information.

The program difference information generator 10300 may also acquire the program difference information, not based on the source codes of the analyzed computer programs, but based on the computer programs in the format of an intermediate code such as the AST, or compare the binary code lengths of corresponding functions described in the binary codes. According to such a modification, the program difference information generator 10300 is enabled to generate the program difference information in an environment in which the first computer program is executed on a first operating system and the second computer program is executed on a second operating system, for example. In this modification, the analysis information generator 102 includes the operating systems information as text information, for example, in the respective pieces of the program information in advance so that the program difference information generator 10300 can compare these pieces of program information including the operating system information, and generate the program difference information.

When the program difference information generated by the program difference information generator 10300 is based on intermediate codes or binary codes, the program difference information generator 10300 can acquire differences in software or hardware resources on which computer programs are executed, e.g., on which one of a plurality of threads or which one of a plurality of cores being hardware each of the computer programs is executed, or how the execution differs between these threads or cores. In this modification as well, the analysis information generator 102 may have these pieces of information included in the program information, and directly compare the program information.

In this manner, the differences can be detected in any way without limitation, as long as such differences can be acquired from the program information of the computer programs being analyzed, and a correspondence relation can be established between each of the acquired differences and a specific element stored as the program information.

In the example illustrated in FIG. 7, the program difference information 701 is retained as text data, but the data format is not limited thereto. The program difference information generator 10300 may retain the program difference information in any other format including, but not limited to, a format stored in some existing database.

The following describes some modifications of the way in which the correspondence relation analyzer 1031 analyzes the correspondence relations between the program information, the program difference information, and the trace difference information. In the embodiment described above, the correspondence relation analyzer 1031 uses the trace difference information and the trace correspondence information generated at the function level to analyze the correspondence relation, but the level of data to be analyzed is not limited thereto. For example, the correspondence relation analyzer 1031 may determine if there is any correspondence relation between the trace difference information and the trace correspondence information using information at the block level, or the level of any other sections of the computer programs. Furthermore, the correspondence relation analyzer 1031 may also make an analysis of the program difference information and the trace difference information more granularly so that an analysis can be made on which difference in the program information has resulted in a difference in the trace. When pieces of different information are found to be related to one another in this modification, the correspondence relation analyzer 1031 may output all of these information pieces as the analysis result, or may select a predetermined number of pieces of information from those with a stronger causality and output the selected pieces of information as the analysis result. The correspondence relation analyzer 1031 may also retain the actual value used in the variable as the execution information. In this manner, when the program information is modified, the correspondence relation analyzer 1031 can analyze how the parts having determined unrelated are affected by the modification via the variable, and determine that the parts having determined unrelated as related depending on the result of the analysis.

In the embodiment described above, the correspondence relation analyzer 1031 finds correspondence relations between the program information, the program difference information, and the trace difference information in the units of one line of the source codes of the computer programs, but the units in which the correspondence relations are found is not limited thereto. The program information may, for example, have some information partly or entirely affecting the source codes of the computer programs included in the computer programs, additionally to the source codes. Examples of such information include information of the operating systems, threads, or cores on which the analyzed computer programs are executed. The correspondence relation analyzer 1031 may then be caused to analyze the correspondence relations with these pieces of information.

In the manner described above, the correspondence relation analyzer 1031 may find correspondence relations between the program information, the program difference information, and the trace difference information in any way including but not limited to those described above.

In the embodiment described above, the correspondence relation analyzer 1031 finds correspondence relations between the program difference information and the trace difference information, and both of the computer program 301 and the computer program 302 that are handled as the program information, but the correspondence relation analyzer 1031 may find correspondence relations to only one of the computer program 301 and the computer program 302 to the program difference information and the trace difference information. In such a modification, because a correspondence relation is established to only one of the computer program 301 and the computer program 302, the display information generator 104 may display only the selected one of the computer programs.

The following describes some modifications related to the process of generating the display information performed by the display information generator 104. In the embodiment described above, the display information generator 104 generates display information for displaying the display screen 801, of which example is illustrated in FIG. 8, in which differences are pointed out directly on the source codes of the computer programs, but the information generated by the display information generator 104 is not limited thereto. For example, the display information generator 104 may present the program information other than the source code as text information, or generate display information for displaying abstractions of the program information. An example of such abstractions includes a shape (icon) representing the program information.

In the example illustrated in FIG. 8, the display information generator 104 generates the display information based on the number of times a function is executed, but the information generated by the display information generator 104 is not limited thereto. The display information generator 104 may generate, for example, display information for displaying a correspondence relation between some countable event information, e.g., a memory access or passing of a specific point, and a difference in the program information.

The display information generator 104 may also generate display information for displaying differences at the block level, or the level of any other sections of the computer programs, without limitation to the function level. The display information generator 104 may also generate display information for displaying differences in the execution information at particular timing. For example, the display information generator 104 may display, for each of the computer programs having analyzed, some information that changes over time, e.g., memory utilization, of which difference is displayed in an emphasized manner, with a link set up to a piece of computer program information serving as the cause of the difference.

In the example illustrated in FIG. 8, the differences are emphasized with a shape pointing to and a frame surrounding the difference, added by the display information generator 104. However, the shape and the frame are merely exemplary, and the difference may be emphasized any other ways without limitation. The display information generator 104 may clearly visualize the difference by, for example, displaying the difference with another color that is not the color used for the other parts, displaying a shape pointing to the difference in a larger size, and using a different font or thickness for the characters indicating the difference. The display information generator 104 may also generate display information for displaying the information indicating the difference at a position attracting user's eyes. As described above, the display information generator 104 may display the differences in any way, including but not limited to those described above, as long as such differences can be recognized by users as being emphasized, with respect to the remaining of the display information.

Advantageous Effects

As described above, when a difference analysis is conducted on a plurality of computer programs, the analysis apparatus 100 according to the first embodiment allows users to easily recognize a difference in behaviors of the computer programs having resulted from a difference in the computer program information. The first embodiment provides many advantageous effects including, but not limited to, those mentioned above, and some example of which will now be explained.

The analysis apparatus 100 according to the first embodiment facilitates understanding of the processing time required in executing a plurality of computer programs. While means for allowing recognition of the processing time required in executing a computer program has been available in a wide variety, when some phenomenon related to the execution occurs, e.g., when there are a numerous number of test cases and the execution time increases or becomes instable only in specific test cases, the efficiency in the computer program development can be improved by facilitating users to find out which part of the analyzed computer program is the cause of the phenomenon.

By conducting an analysis on each of such test cases with the analysis method according to the first embodiment, it becomes possible to find out in which test case the phenomenon related to the execution time occurs, and in which part of the computer program information the phenomenon occurs.

The analysis apparatus 100 according to the first embodiment may have processing time information for a specific section of a computer program such as a function or a loop, or information of time at which a specific point is passed as the trace information, and have the program information included with the information for which test cases the computer programs are executed. The analysis apparatus 100 is whereby allowed to analyze and to visualize in which test cases the execution time has changed, and in which part of the computer programs has resulted in the change in the execution time. The users are thus allowed to understand the phenomenon related to the processing time easily.

The analysis apparatus 100 according to the first embodiment also facilitate users to isolate the cause of an error when compared are a plurality of computer programs. The analysis apparatus 100 may receive inputs of, for example, a version of a computer program normally operating and another version of the computer program causing an error, and collect the trace information. The analysis apparatus 100 then generates the trace difference information and the program difference information, analyzes the correspondence relation between the generated trace difference information and program difference information, and the program information, and displays the correspondence relation. The user can then find some differences that are possibly the cause of the error from the computer programs. The user is thus allowed to isolate and discover possible causes of the error more efficiently, compared with when inspections are conducted manually on the entire computer programs.

In the manner described above, through comparison between the program information of a computer program with an error and that of another computer program without any error, the analysis apparatus 100 can facilitate users to discover the cause of the error.

The analysis apparatus 100 according to the first embodiment can also facilitate users to recognize the utilization level of hardware resources such as a memory, when compared are a plurality of computer programs.

The analysis apparatus 100 according to the first embodiment may have hardware resource information such as memory information included in the program information and the trace information, and generate program difference information and trace difference information including the differences in the hardware resource information. The analysis apparatus 100 is then allowed to analyze the correspondence relation between the program difference information, the trace difference information, and the program information. In this manner, the analysis apparatus 100 can get grasp of how the utilization level of the hardware resources such as a memory changes when the source code in the program information is modified, for example. In the manner described above, the analysis apparatus 100 can visualize the consequences of a modification in a computer program, so that the users can recognize how the hardware resource such as a memory are utilized differently between the computer programs to be analyzed, and find out which difference in the computer programs to be analyzed has caused the difference in the hardware utilization.

The analysis apparatus 100 according to the first embodiment can also facilitate users to recognize the difference in the power consumption, when compared are a plurality of computer programs.

The analysis apparatus 100 according to the first embodiment may have the trace information included with information of power consumption and information of used instructions and memory accesses during the time for which the computer programs are executed, and run a method for calculating the power consumption on the trace information including these pieces of information. The analysis apparatus 100 is then allowed to analyze the correspondence relation between the trace difference information that includes a difference in the powers consumed by the computer programs, and the computer program difference information that includes differences in the source codes. In this manner, the analysis apparatus 100 can get grasp of how the power consumption changes when the source code is modified, and visualize how the modification affects the power consumption. In this manner, the analysis apparatus 100 can facilitate users to understand if there is any difference in the power consumption by the computer programs having analyzed, and which difference in the computer programs having analyzed has resulted in the difference in the power consumption.

The analysis apparatus 100 according to the first embodiment can also facilitate users to find some solutions to the problems found in the manner explained in the earlier descriptions of the advantageous effects.

The correspondence relation between the program difference information, the trace difference information, and the program information found through the analysis conducted by the analysis apparatus 100 according to the first embodiment represents a difference in the computer programs that can be the cause of a change in the behavior of the computer program. By displaying the program information related to the trace information having the advantageous effects described above, the analysis apparatus 100 can clearly visualize which part of the program information requires fixing.

Second Embodiment

Figure 23:
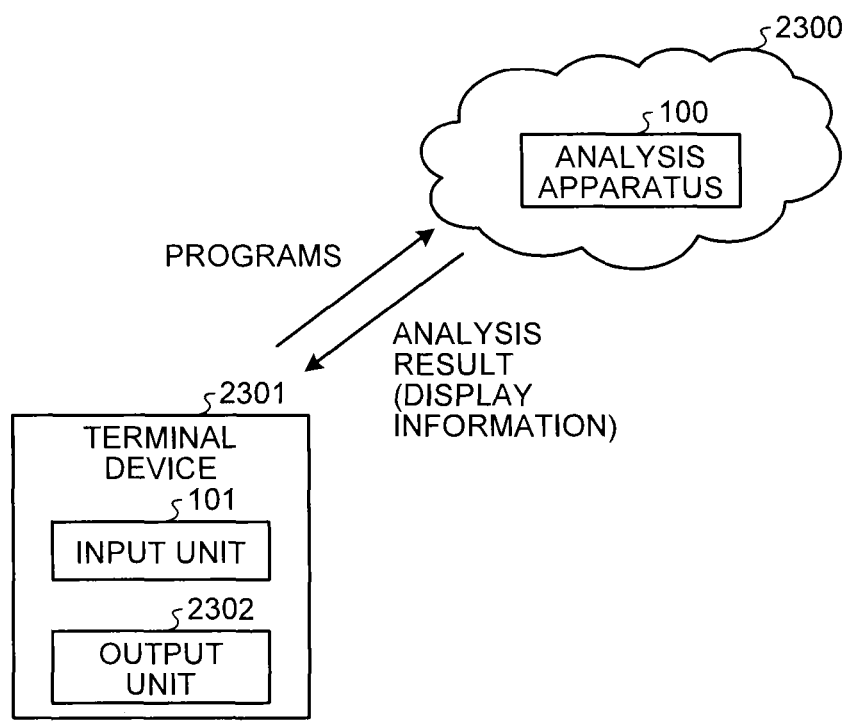
FIG. 23 is a block diagram of an example of a configuration of an analysis system that can be used in a second embodiment.

A second embodiment will now be explained. The second embodiment represents an example of an analysis system that is the analysis apparatus 100 according to the first embodiment deployed in a network cloud. FIG. 23 illustrates an exemplary possible configuration of the analysis system according to the second embodiment. In FIG. 23, parts that are the same with those in FIG. 1 are assigned with the same reference numerals, and detailed explanations thereof are omitted herein.

In the analysis system illustrated in FIG. 23, the analysis apparatus 100 is deployed in a network cloud 2300. The network cloud 2300 includes a plurality of computers connected each other over a network, and represents a network group viewed as a black box internal of which is hidden and only input to and output from which are visible from the external. The network cloud 2300 uses the Transmission Control Protocol/Internet Protocol (TCP/IP) as communication protocols, for example.

A terminal device 2301 includes a communication I/F for establishing communications with the network cloud 2300, and the input unit 101 and an output unit 2302. In other words, in the exemplary configuration illustrated in FIG. 23, the input unit 101, which is one of the functions of the analysis apparatus 100, is implemented on the terminal device 2301. A general computer may be used as the terminal device 2301, for example, or a dedicated device may be provided for the analysis apparatus 100. The input unit 101 receives the computer programs to be analyzed in the manner described above. The output unit 2302 provides display based on the display information received from the network cloud 2300.

In the terminal device 2301, the input unit 101 receives the computer programs to be analyzed. The terminal device 2301 transmits the computer programs received via the input unit 101 to the network cloud 2300. The computer programs are passed to the analysis apparatus 100 in the network cloud 2300.

The analysis apparatus 100 in the network cloud 2300 includes the analysis information generator 102, the analyzer 103, and the display information generator 104. The analysis apparatus 100 causes the analysis information generator 102 to generate the trace information, the trace correspondence information, and the program information from the received computer programs, and causes the analyzer 103 to generate the trace difference information and the program difference information based on the trace information, the trace correspondence information, and the program information. The analysis apparatus 100 then causes the analyzer 103 to analyze the correspondence relations between the trace difference information, the program difference information, and the program information based on the information such as the trace difference information and the program difference information, and causes the display information generator 104 to generate display information for displaying the analysis result. The display information generated in the network cloud 2300 is then transmitted to the terminal device 2301. The terminal device 2301 displays a display screen on a display device based on the display information.

When the terminal device 2301 is implemented as a general computer, a browser application (hereinafter, referred to as a browser) may be used as the input unit 101 and the output unit 2302, as an example. The input unit 101 and the output unit 2302 may also be a piece of application software dedicated to the analysis system according to the second embodiment, without limitation to a browser.

The analysis apparatus 100 provides the terminal device 2301 with an input form for entering computer programs having prepared in advance using a programming language that is parsable by the browser, with a predetermined uniform resource locator (URL), as the input unit 101. The browser then causes the display device of the terminal device 2301 to displays the input form to prompt a user to enter the computer programs to be analyzed.

The analysis apparatus 100 also generates display information for displaying the analysis result in a programming language parsable by the browser, and provides the display information to the terminal device 2301 with a predetermined URL. The browser on the terminal device 2301 causes the display device on the terminal device 2301 to display the analysis result based on the display information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An analysis system comprising:
processing circuitry having
an analysis information generator configured to
  generate first trace information and second trace information, wherein the first trace information and the second trace information include type information that indicates a type of the execution, and
  generate trace correspondence information that indicates a correspondence between the first trace information and first program information and a correspondence between the second trace information and second program information, the first program information and the second program information being source codes or assembly codes;
a trace difference information generator configured to generate trace difference information for each type of the execution indicated by the type information, wherein the trace difference information indicates a difference between the first trace information and the second trace information;
a program difference information generator configured to generate program difference information that indicates a difference between the first program information and the second program information;
a correspondence analyzer configured to analyze a correspondence between the trace difference information and the program difference information based on the trace correspondence information, wherein the correspondence is analyzed for each type of the execution; and
a display information generator configured to generate display information for displaying the correspondence between the trace information and the program difference information in a manner associated with at least one of the first program information and the second program information, and output the display information for each type of the execution, wherein the first trace information provides a description of an execution at particular timing while a first program is being executed, based on the first program information, and the second trace information that provides a description of an execution at particular timing while a second program is being executed based on second program information.

2. The system according to claim 1, wherein the first program information includes a source code of the first program, the second program information includes a source code of the second program, and the trace correspondence information includes a correspondence between the source code of the first program and the first trace information and a correspondence between the source code of the second program and the second trace information.

3. The system according to claim 1, wherein the analysis information generator is configured to generate the first trace information and the second trace information so that the first trace information and the second trace information include order information that specifies an order of the trace information, and the trace difference information generator is configured to compare the first trace information and the second trace information based on the order information, and extract as a difference a part of the description of an execution determined not to be identical.

4. The system according to claim 1, wherein the analysis information generator is configured to generate the first trace information and the second trace information that include parent-child relation information for specifying a parent-child relation between units of execution of the program, and the trace difference information generator is configured to compare the first trace information and the second trace information based on the parent-child relation information, and extract as a difference a part of the description of an execution determined not to be identical.

5. The system according to claim 1, wherein the first program information is the program information required in executing the first program, and the second program information is program information required in executing the second program which is updated from the first program.

6. An analysis method comprising:
generating first trace information and second trace information, wherein the first trace information and the second trace information include type information that indicates a type of the execution;
generating trace correspondence information that indicates a correspondence between the first trace information and first program information and a correspondence between the second trace information and second program information, the first program information and the second program information being source codes or assembly codes;
generating trace difference information for each type of the execution indicated by the type information, wherein the trace difference information indicates a difference between first trace information and second trace information;
generating program difference information that indicates a difference between the first program information and the second program information;
analyzing a correspondence between the trace difference information and the program difference information based on the trace correspondence information, wherein the correspondence is analyzed for each type of the execution; and
generating display information for displaying the correspondence between the trace information and the program difference information in a manner associated with at least one of the first program information and the second program information, and outputting the display information for each type of the execution, wherein
the first trace information provides a description of an execution at particular timing while a first program is being executed, based on the first program information, and the second trace information that provides a description of an execution at particular timing while a second program is being executed based on second program information.

7. The method according to claim 6, wherein the first program information is the program information required in executing the first program, and the second program information is program information required in executing the second program which is updated from the first program.

8. A non-transitory computer-readable medium having computer-readable instructions therein which when executed by a computer, cause the computer to execute a method comprising:
generating first trace information and second trace information, wherein the first trace information and the second trace information include type information that indicates a type of the execution;
generating trace correspondence information that indicates a correspondence between the first trace information and first program information and a correspondence between the second trace information and second program information, the first program information and the second program information being source codes or assembly codes;
generating trace difference information for each type of the execution indicated by the type information, wherein the trace difference information indicates a difference between first trace information and second trace information;
generating program difference information that indicates a difference between the first program information and the second program information;
analyzing a correspondence between the trace difference information and the program difference information based on the trace correspondence information, wherein the correspondence is analyzed for each type of the execution; and
generating display information for displaying the correspondence between the trace information and the program difference information in a manner associated with at least one of the first program information and the second program information, and outputting the display information for each type of the execution, wherein
the first trace information provides a description of an execution at particular timing while a first program is being executed, based on the first program information, and the second trace information that provides a description of an execution at particular timing while a second program is being executed based on second program information.

9. The non-transitory computer-readable medium according to claim 8, wherein the first program information is the program information required in executing the first program, and the second program information is program information required in executing the second program which is updated from the first program.

\* \* \* \* \*